(12) United States Patent
Ouis et al.

(10) Patent No.: US 12,140,566 B1
(45) Date of Patent: Nov. 12, 2024

(54) APPARATUS, SYSTEM AND METHOD FOR SENSING THE VIBRATIONS OF EVEN CROSS-SECTIONAL MODES IN A CIRCULAR CYLINDER USING A PIEZOELECTRIC WIRE

(71) Applicant: KING FAHD UNIVERSITY OF PETROLEUM AND MINERALS, Dhahran (SA)

(72) Inventors: Djamel Ouis, Dhahran (SA); Mohammad Ahmad Hassanain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/760,650

(22) Filed: Jul. 1, 2024

(51) Int. Cl.
*G01N 29/12* (2006.01)
*G01N 29/04* (2006.01)
*G01N 29/24* (2006.01)
*G01N 29/46* (2006.01)

(52) U.S. Cl.
CPC ........... *G01N 29/12* (2013.01); *G01N 29/045* (2013.01); *G01N 29/2437* (2013.01); *G01N 29/46* (2013.01); *G01N 2291/014* (2013.01); *G01N 2291/023* (2013.01); *G01N 2291/2634* (2013.01)

(58) Field of Classification Search
CPC .. G01N 29/12; G01N 29/045; G01N 29/2437; G01N 29/46; G01N 2291/014; G01N 2291/023; G01N 2291/2634
See application file for complete search history.

(56) References Cited

U.S. PATENT DOCUMENTS 11,162,869 B2 * 11/2021 Ouis .................. G01M 5/0058
2005/0072216 A1 4/2005 Engel

FOREIGN PATENT DOCUMENTS

| MX | 2008/009757 A | 2/2010 |
|---|---|---|
| WO | WO 2021/003200 A1 | 1/2021 |

OTHER PUBLICATIONS

Djamel Quis, "Potential use of a piezoelectric wire sensor for monitoring the bending vibrations of logs", Forest Products Journal, vol. 50, No. 4. Apr. 2000, pp. 61-64.

* cited by examiner

*Primary Examiner* — Tarun Sinha
(74) *Attorney, Agent, or Firm* — Oblon, McClelland, Maier & Neustadt, L.L.P.

(57) ABSTRACT

A piezoelectric sensor for sensing an ovalling mode in a cylindrical structure, a non-destructive testing system for determining the strength condition of the cylindrical structure, and a method for non-destructive testing of the cylindrical structure are provided. The piezoelectric sensor includes an H-shaped caliper with a first and second arm, connected by a crossbar, and has a caliper connector near first end of each arm and a wire connector near second end of each arm. A piezoelectric wire is connected and stretched between the wire connectors and is connected to an electrical terminal to provide electrical signal in response to expansion and contraction as a result of vibrations induced in the cylindrical structure. The system includes a measurement unit connected to the electrical terminal, to receive and perform a frequency analysis of the electrical signal based on the ovalling mode and output a stiffness value of the cylindrical structure.

20 Claims, 9 Drawing Sheets

Eigenfrequency = 795.43 Hz Surface: displacement magnitude

Eigenfrequency = 795.76 Hz

APPARATUS, SYSTEM AND METHOD FOR SENSING THE VIBRATIONS OF EVEN CROSS-SECTIONAL MODES IN A CIRCULAR CYLINDER USING A PIEZOELECTRIC WIRE

BACKGROUND

Technical Field

The present disclosure is directed to an apparatus, a system and a method for sensing the vibrations of even cross-sectional modes in a circular cylinder using a piezoelectric wire affixed to an H-shaped caliper.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the construction and utility sectors, cylindrical elements such as metal and concrete columns, as well as wooden poles and logs, are widely used. These structures bear significant loads in buildings, bridges, harbor piers, and serve as supports for lamp posts, telephone, and electric power cables. In the wood industry, the quality of lumber, which is processed from logs, depends on the health of the trees. Therefore, assessing the structural integrity and health status of these cylindrical elements before their utilization or processing is required for operational efficiency and effectiveness. The ability to pre-evaluate the condition of these elements can prevent wasteful expenditures of time and resources on unsuitable materials and ensure safety and reliability in their application.

Traditional methods for assessing the health of cylindrical elements, especially in forestry and small to medium-sized wood operations, often rely on rudimentary and subjective techniques. Methods such as tapping wood with a hammer or probing with a screwdriver are not only imprecise but prone to human error, leading to potentially viable wood being discarded due to superficial signs of decay. This approach lacks the reliability and accuracy needed for effective decision-making, highlighting the need for more sophisticated and objective assessment methods.

Measuring the stiffness of a solid material elongated element by 3-point or cantilever bending tests provides useful information on the material properties of prismatic elements. While 3-point or cantilever bending tests offer insights into material properties for prismatic elements, they are impractical or impossible for cylindrical elements, especially those already integrated into structures or those that are voluminous, such as logs and standing tree trunks. Moreover, applying force to the top of a wooden pole in such tests could pose safety risks to technical personnel, which highlights the need for a safer, more efficient method of assessing stiffness and structural integrity elements. Some of these techniques use vibrations or sound, even ultrasound, to excite the wooden element and monitor its response. Others use an electrical voltage applied between two nearby positions on the wood element to measure the electrical resistance between them. Other more elaborate techniques use penetrating X or gamma rays and process a tomogram of the interior of the investigated wood element. In general, most of these methods can only locate rot pockets, that is when the decay stage is at a so advanced stage that most of the material has been removed. However, decay attack even at its incipient stage can have a pronounced destructive effect while it cannot be detected by the naked eye or probed by advanced optical equipment. Decay attacks also result in an elevated rate of moisture content, which makes some of the aforementioned methods more sensitive, and sometimes unreliable when water content affects the variables they measure.

U.S. Pat. No. 20050072216A1 describes a piezocable based sensor for measuring unsteady pressures inside a pipe, and comprises a cable wrapped around the pipe and an outer band compressing the cable towards the pipe. The cable provides a signal indicative of unsteady pressure within the pipe in response to expansion and contraction of the pipe. The reference describes measurement made of the unsteady pressure inside a pipe, and which may be caused by, for instance, clogging inside the tube or unsteady turbulent flow of the fluid inside it. In that case, the wire sensor senses the overall swelling of the pipe with no consideration of any particular cross-sectional vibrational mode, neither does it address the physical or geometrical attributes of the pipe. The inner overpressure or underpressure of the fluid respectively enlarges or diminishes the circumference of the pipe, hence extending or shrinking the length of wire sensor wrapped and attached to the external surface of the pipe. This reference details sensing the fluid pressure acting on the inner surface of the pipe but no consideration is made of the various proper vibration modes of the pipe. This reference does not provide an H-shaped caliper with a clamping mechanism and the piezoelectric transducer is not in the form of wire held on the ends of the calipers. Further, this reference does not provide details of measurement unit and there is no discussion of detecting an ovalling mode.

MX2008009757A describes a clamping mechanism which can be placed around 4-8 inch diameter pipes for non-destructive tests by ultrasound. The clamp includes ultrasonic transducers which inject ultrasonic waves into the pipe. Four piezoelectric transducers are placed equidistant around the internal surface of the clamping mechanism to receive the ultrasonic signals which pass through the pipe. This reference describes a method for measuring the thickness of a pipe. This reference does not provide an H-shaped caliper for the clamping mechanism and the piezoelectric transducer is not in the form of wire held on the ends of the calipers. Additionally, this reference provides that ultrasonic signals are generated in the clamping mechanism and does not utilize an outside stimulus to generate the ultrasonic waves. Further, this reference does not provide details of measurement unit and there is no discussion of detecting an ovalling mode.

WO2021003200A1 describes a measuring device including piezoelectric wire. The measuring device measures a deceleration of a tapping rod upon impact with an object during operation, or any vibration caused by the tapping rod on the specimen. The piezoelectric force sensor may detect changes in the properties of the object and may quantify objectively its internal characteristics. Data transmitted by the piezoelectric force sensor may be processed by a system program. This reference does not provide an H-shaped caliper for the clamping mechanism and the piezoelectric transducer is not in the form of wire held on the ends of the calipers. Further, this reference does not provide details of measurement unit and there is no discussion of detecting an ovalling mode.

U.S. Pat. No. 3,043,132A describes a sonic tester for a workpiece, integrating a variable frequency oscillator and a driver that work in unison to obtain variable frequency mechanical vibrations within the workpiece. A vibration pickup, responsive to these induced vibrations' amplitude, is linked to multiple channels, each equipped with bandpass filter means. These channels are operative in generating an output signal when vibration amplitudes surpass a predefined threshold and fall within their respective frequency bands. A coincidence circuit connected to these channels is designed to output a signal solely when all channels concurrently emit an output signal. This reference does not provide an H-shaped caliper for the clamping mechanism and the piezoelectric transducer is not in the form of wire held on the ends of the calipers. Further, this reference does not provide any discussion of detecting an ovalling mode.

U.S. Pat. No. 3,877,294A describes a method to identify decay in wooden poles or trees. The proposed method includes subjecting the pole to mechanical vibratory forces within the sonic frequency range and measuring the emergent energy at various axial points along the pole, quantified in terms of R.M.S. velocity or acceleration of vibrations. The comparative analysis of these emergent energy measurements at specified points is employed to ascertain the presence of decay. This reference does not provide an H-shaped caliper for the clamping mechanism and the piezoelectric transducer is not in the form of wire held on the ends of the calipers. Further, this reference does not provide any discussion of detecting an ovalling mode.

U.S. Pat. No. 4,059,988 describes a method and an apparatus for screening wooden poles, which identifies poles necessitating detailed examination due to rot or other deterioration. The proposed method involves injecting "white sound" into the pole at 40 Hz and gauging vibrational energy amplitudes at 100 Hz and 350 Hz opposite the injection point. Amplitude comparisons at these frequencies indicate whether the pole has passed the screening. This process is performed at two perpendicular positions on the pole, with the screening apparatus potentially being integrated with more comprehensive examination tools. This reference does not provide an H-shaped caliper for the clamping mechanism and the piezoelectric transducer is not in the form of wire held on the ends of the calipers. Further, this reference does not provide any discussion of detecting an ovalling mode.

U.S. Pat. No. 4,399,701 describes a method and an apparatus for detecting wood decay by administering acoustic waves along the wood grain and measuring the bandwidths and frequencies of resonances as the frequency of the applied waves varies. High-quality wood exhibits a nearly harmonic resonance frequency relationship, with relatively narrow resonance bandwidths. This reference does not provide an H-shaped caliper for the clamping mechanism and the piezoelectric transducer is not in the form of wire held on the ends of the calipers. Further, this reference does not provide any discussion of detecting an ovalling mode.

U.S. Pat. No. 11,162,869B2 describes a testing apparatus, method and system for determining the ovaling mode in a cylindrical object, which may be excited through the synchronous application of two diametrically opposed identical vibrators to the outer perimeter. At least one vibration sensor transforms the vibrations to electrical voltage signals. Two vibration sensors placed at diametrically opposed locations, each halfway between the vibration inducers, may be used with a summer for adding the in phase response signals. The signal response is then converted into a digital signal and transformed into the frequency domain through a Fourier transform for determining the frequencies of the modes of interest. The resonant frequency of the ovaling mode of the element is identified and compared to that of a reference cylindrical object with comparable cross-sectional size to establish the stiffness and soundness degree of the cylindrical object. A structural integrity report including the strength and stiffness is generated. This reference does not provide an H-shaped caliper for the clamping mechanism and the piezoelectric transducer is not in the form of wire held on the ends of the calipers.

Non-patent reference titled "Potential use of a piezoelectric wire sensor for monitoring the bending vibrations of logs" (2000) describes a piezoelectric wire sensor in cable form, used for monitoring the bending vibrations of logs under impact excitation, i.e., the sensor detected the response of the log in response to a hammer stroke. The log is held on edge knife supports and subjected to a light hammer blow. This reference does not provide an H-shaped caliper for the clamping mechanism and the piezoelectric transducer is not in the form of wire held on the ends of the caliper.

Each of the aforementioned references suffers from one or more drawbacks hindering their adoption, such as lacking specificity in detecting vibrational modes, absence of an H-shaped caliper for precise positioning, and the like. These limitations restrict their effectiveness in accurately assessing the structural integrity of cylindrical elements, particularly in detecting early signs of decay or structural weaknesses, thereby emphasizing the need for a more reliable solution. Accordingly, it is one object of the present disclosure to provide methods and systems for non-destructively assessing the structural integrity and stiffness of cylindrical elements to accurately detect early signs of decay, which is applicable to elements in situ, and does not pose safety risks during evaluation.

SUMMARY

In an exemplary embodiment, a piezoelectric sensor for sensing an ovalling mode in a cylindrical structure is described. The piezoelectric sensor comprises an H-shaped caliper comprising a first arm, a second arm and a crossbar connected to and perpendicular to the first arm and the second arm. The piezoelectric sensor further comprises a first caliper connector located near a first end of the first arm. The piezoelectric sensor further comprises a second caliper connector located near a first end of the second arm. The piezoelectric sensor further comprises a first wire connector located near a second end of the first arm. The piezoelectric sensor further comprises a second wire connector located near a second end of the second arm. The piezoelectric sensor further comprises a piezoelectric wire connected to the first wire connector and the second wire connector. The piezoelectric wire is stretched between the first wire connector and the second wire connector. The piezoelectric sensor further comprises an electrical terminal connected to the piezoelectric wire at the second wire connector. Herein, the electrical terminal is configured to receive an electrical signal generated by the piezoelectric wire in response to expansion and contraction of a distance between the second end of the first arm and the second end of the second arm as a result of vibrations induced in the cylindrical structure.

In another exemplary embodiment, a non-destructive testing system for determining the strength condition of a cylindrical structure is described. The non-destructive testing system comprises a transducer configured to induce vibrations in the cylindrical structure. The non-destructive testing system further comprises a piezoelectric sensor. The piezoelectric sensor includes an H-shaped caliper comprising a first arm, a second arm and a crossbar connected to and perpendicular to the first arm and the second arm. A length of the crossbar is equal to a cross-sectional diameter of the cylindrical structure. The piezoelectric sensor further includes a first caliper connector located near a first end of the first arm. The piezoelectric sensor further includes a second caliper connector located near a first end of the second arm. The piezoelectric sensor further includes a first wire connector located near a second end of the first arm. The piezoelectric sensor further includes a second wire connector located near a second end of the second arm. The piezoelectric sensor further includes a piezoelectric wire connected to the first wire connector and the second wire connector. The piezoelectric wire is stretched between the first wire connector and the second wire connector. The non-destructive testing system further comprises an electrical terminal connected to the piezoelectric wire near the second end of the second arm. Herein, the electrical terminal is configured to receive an electrical signal generated by vibrations in the piezoelectric wire in response to expansion and contraction of a distance between the second end of the first arm and the second end of the second arm as a result of the vibrations induced in the cylindrical structure. The non-destructive testing system further comprises a measurement unit connected to the electrical terminal, wherein the measurement unit is configured to receive the electrical signal, perform a frequency analysis of the electrical signal and output a stiffness value of the cylindrical structure.

In still another exemplary embodiment, a method for non-destructive testing of a cylindrical structure is described. The method comprises connecting a first end of a first arm and a first end of a second arm of an H-shaped caliper across a diameter of the cylindrical structure at a first height from a bottom of the solid cylindrical structure. The method further comprises stretching a piezoelectric wire between a second end of the first arm and a second end of the second arm. The method further comprises connecting an electrical terminal of the piezoelectric wire to a measurement unit. The method further comprises inducing vibrations in the cylindrical structure by striking the cylindrical structure at a second height selected from a range greater than the first height by 4 cm to 12 cm. The method further comprises receiving, by the measurement unit, an electrical signal generated by vibrations in the piezoelectric wire in response to expansion and contraction of a distance between the second end of the first arm and the second end of the second arm as a result of the vibrations induced in the cylindrical structure. The method further comprises performing, by the measurement unit, a frequency analysis of the electrical signal to identify a resonance frequency of an ovalling mode of the electrical signal. The method further comprises matching, by the measurement unit, the resonance frequency of the ovalling mode to a database record including ovalling modes versus stiffness values for cylindrical structures. The method further comprises outputting, on a display of the measurement unit, the stiffness value.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
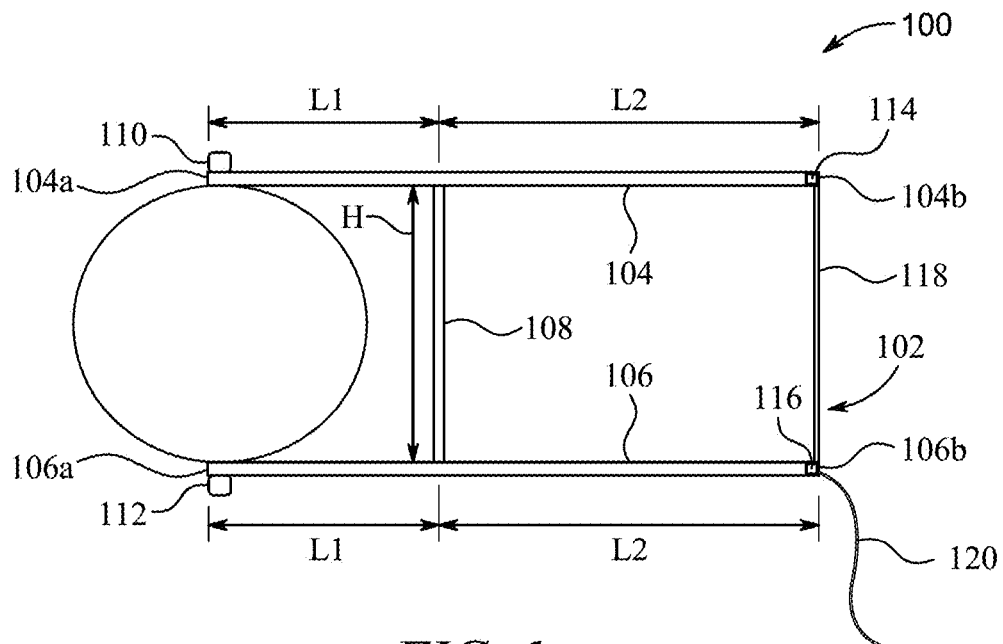
FIG. 1 is a schematic diagram of a piezoelectric sensor for sensing an ovalling mode in a cylindrical structure, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a piezoelectric sensor, a non-destructive testing system for determining the strength condition of a cylindrical structure, and a method for non-destructive testing of a cylindrical structure. The present disclosure addresses the limitations of existing testing methods to provide evaluation of strength conditions of cylindrical structures, offering enhanced accuracy, safety, and efficiency in structural integrity assessments. The present disclosure incorporates an H-shaped caliper and piezoelectric wire sensor, to provide a novel approach to clamping and signal detection, and for assessing the health and longevity of critical infrastructure components.

Referring to FIG. 1, illustrated is a schematic diagram of a piezoelectric sensor (as represented by reference numeral 100). The piezoelectric sensor 100 of the present disclosure is implemented for sensing an ovalling mode in a cylindrical structure. The piezoelectric sensor 100 addresses the need for accurate assessment of the structural integrity of the cylindrical structures. The piezoelectric sensor 100 operates on the principle of piezoelectricity, where mechanical stress, such as that induced by the ovalling mode, is converted into an electrical signal that can be measured and analyzed. The utility of the piezoelectric sensor 100 extends across various industries where cylindrical structures are foundational elements. In construction, utility, and even the wood industry, the piezoelectric sensor 100 can be used to predict the lifespan of pillars, poles, and logs, thereby informing maintenance schedules, safety checks, and harvesting decisions.

As used herein, the "cylindrical structure" refers to any elongated object with a circular cross-section. The cylindrical structure includes a broad range of elements commonly used in various fields such as construction, utilities, and natural resources. Examples include metal or concrete columns that are utilized in building infrastructure, such as those found in bridges and harbor piers, as well as wooden poles used for supporting cables in electrical and telecommunication networks. Additionally, in the wood industry, the term extends to include tree trunks from which logs are derived for lumber production. In the present examples, the cylindrical structure may be either solid or hollow, and can be made of various materials such as metal, concrete or wood without any limitations. The piezoelectric sensor 100 of the present disclosure provides a non-destructive method for the assessment of the structural integrity of cylindrical structures.

Figure 2:
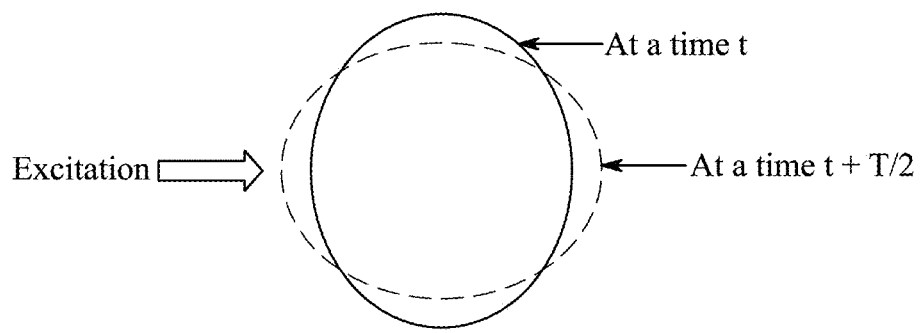
FIG. 2 is an exemplary depiction of dynamic behavior of a cylindrical structure when subjected to an external excitation force, according to certain embodiments.

Further, the "ovalling mode" in the context of the cylindrical structure refers to the distortion of round cross-section of the cylindrical structure into an oval shape. This mode is a specific type of deformation that can occur under certain conditions, such as when the structure is subjected to external forces or pressures that cause it to flex or bend. Referring to FIG. 2, a dynamic behavior of an exemplary cylindrical structure when subjected to an external excitation force is depicted. The force induces a distortion in the round cross-section of the cylinder, causing it to oscillate between a round and an oval shape, as seen at times t and t+T/2, respectively. This periodic distortion, known as the ovalling mode, is characterized by the alternating compressive and tensile stresses that occur around the circumference of the cylindrical structure. The ovalling mode is particularly significant in the assessment of structural integrity because it can indicate areas of weakness or potential failure within the cylindrical structure. By analyzing the presence and characteristics of the ovalling mode, it is possible to gain insights into the material properties and overall health of the cylindrical structure.

Referring back to FIG. 1, as illustrated, the piezoelectric sensor 100 includes an H-shaped caliper 102. The H-shaped caliper 102 includes a first arm 104 and a second arm 106. The H-shaped caliper 102 also includes a crossbar 108 connected to and perpendicular to the first arm 104 and the second arm 106. The H-shaped caliper 102 is designed to provide a stable base for the piezoelectric sensor 100, ensuring that it maintains optimal contact with the cylindrical structure (circular cross-sectional face held between the ends 104a and 106a of the arms 104 and 106) to accurately detect the vibrational modes indicative of its structural health. The first arm 104 and the second arm 106 are the primary contact elements that secure the piezoelectric sensor 100 to the cylindrical structure. The crossbar 108 provides structural support to the first arm 104 and the second arm 106. The crossbar 108 also serves as a reference for aligning the piezoelectric sensor 100 with axis of the cylindrical structure. The first arm 104 and the second arm 106 extend from the crossbar 108, which acts as a stabilizing backbone for the H-shaped caliper 102. In particular, the first arm 104 and the second arm 106 of the H-shaped caliper 102 are positioned diametrically opposite each other when installed on the cylindrical structure. This positioning provides for a symmetrical application of the piezoelectric sensor 100, for balanced signal detection and accurate interpretation of the ovalling mode.

Also, as illustrated in FIG. 1, the first arm 104 has a first end 104a and a second end 104b, and the second arm 106 has a first end 106a and a second end 106b. The piezoelectric sensor 100 includes a first caliper connector 110 located near the first end 104a of the first arm 104, and a second caliper connector 112 located near the first end 106a of the second arm 106. The caliper connectors 110, 112 form the primary attachment points to the cylindrical structure that configure the piezoelectric sensor 100 to detect vibrations with precision and reliability. The first caliper connector 110, located near the first end 104a of the first arm 104, and the second caliper connector 112, located near the first end 106a of the second arm 104, serve as contact points that translate the structural vibrations into measurable piezoelectric signals. The caliper connectors 110, 112 are configured to firmly grip the exterior or circumference of the cylindrical structure without causing damage thereto. In general, the caliper connectors 110, 112 are designed to facilitate easy attachment and detachment, providing convenience and efficiency for operators conducting multiple assessments across different cylindrical structures. In an aspect, the caliper connectors 110, 112 may include a rubber surface which grips the cylindrical structure. In another aspect, the caliper connectors 110, 112 may have a toothed surface which grips the cylindrical structure. In a further aspect, the caliper connectors 110, 112 may have threaded ends which extend into the cylindrical structure to hold the caliper ends 104a and 106a securely against the cylindrical structure.

Further, as illustrated in FIG. 1, the piezoelectric sensor 100 includes a first wire connector 114 located near a second end 104b of the first arm 104, and a second wire connector 116 located near a second end 106b of the second arm 106. Also, the piezoelectric sensor 100 includes a piezoelectric wire 118 connected to the first wire connector 114 and the second wire connector 116. The wire connectors 114, 116, positioned near the second ends 104b, 106b of the first and second arms 104, 106, serve as anchorage points for the piezoelectric wire 118. The first wire connector 114, located near the second end 104b of the first arm 104, is configured to securely attach one end of the piezoelectric wire 118. Similarly, the second wire connector 116, located near the second end 106b of the second arm 106, is configured to secure the other end of the piezoelectric wire 118. The spatial arrangement between the first and second wire connectors 114, 116 is defined to ensure that the piezoelectric wire 118 spans the necessary distance across the cylindrical structure being analyzed. This arrangement facilitates the effective transmission of vibrational energy from the cylindrical structure to the piezoelectric wire 118, configuring the piezoelectric sensor 100 to detect even changes in vibrational characteristics of the cylindrical structure that are indicative of the ovalling mode.

The piezoelectric wire 118 is made from a material that exhibits piezoelectric properties, which converts mechanical stress induced by the vibrations of the cylindrical structure into electrical signals. In a non-limiting example, the piezoelectric wire 118 may be a piezo cable which is another form of piezo polymer sensors, designed as a coaxial cable. Herein, the piezo polymer is the "dielectric" between the center core and the outer braid. When the piezo cable is compressed or stretched, a charge or voltage is generated proportional to the stress.

The piezoelectric wire 118 is stretched between the first wire connector 114 and the second wire connector 116. The piezoelectric wire 118 has a length equal to about a diameter of the cylindrical structure. The positioning of the wire connectors 114, 116 near the second ends 104b, 106b of the first and second arms 104, 106 provides for the necessary mechanical leverage to apply the appropriate tension to the piezoelectric wire 118. In an example, the caliper is placed a few inches above or below the position of the excitation (electrical) signal, and on lateral positions separated by ninety degrees, in order to avoid the possible interference of local deformations and of near fields caused by the excitation signal. The tension applied to the piezoelectric wire 118, as a result of being stretched between the two wire connectors 114, 116, is calibrated to enhance sensitivity of the piezoelectric wire 118 to the vibrational modes of interest.

The piezoelectric sensor 100 further includes an electrical terminal 120. The electrical terminal 120 is connected to the piezoelectric wire 118 at the second wire connector 116. In general, the electrical terminal 120 is connected to the piezoelectric wire 118 at the second end 106b of the second arm 106. The electrical signals generated by the piezoelectric wire 118, as a result of the structural vibrations, are transmitted to the electrical terminal 120 connected to the piezoelectric wire 118. The electrical terminal 120 is configured to serve as the conduit for the electrical signal generated by the piezoelectric wire 118, which is a direct result of the piezoelectric effect induced by the vibrations within the cylindrical structure. The electrical terminal 120 is designed to minimize any resistance or impedance that could distort or attenuate the electrical signal, ensuring that the data captured by the piezoelectric wire 118 is accurately transmitted for subsequent analysis.

Herein, the electrical terminal 120 is configured to receive the electrical signal generated by the piezoelectric wire 118 in response to expansion and contraction of a distance between the second end 104b of the first arm 104 and the second end 106b of the second arm 106 as a result of vibrations induced in the cylindrical structure. As discussed, the electrical signal is a direct result of the piezoelectric effect, which occurs due to the expansion and contraction of the distance between the second end 104b of the first arm 104 and the second end 106b of the second arm 106. These movements are induced by vibrations within the cylindrical structure, which are characteristic of the ovalling mode as detected by the piezoelectric sensor 100. The electrical terminal 120 is configured to effectively receive signals resulting from a wide range of vibrational frequencies and amplitudes, enhancing applicability of the piezoelectric sensor 100 across different types of cylindrical structures and materials. The sensitivity of the electrical terminal 120 provides for the detection of even subtle changes in the electrical signal, which may indicate early signs of structural compromise within the cylindrical structure.

This configuration ensures that the piezoelectric sensor 100, when applied to the cylindrical structure, can effectively sense changes in dimensions of the cylindrical structure as it undergoes stress, for determining the presence and severity of potential structural issues. Overall, the H-shaped caliper 102, with its specific dimensions and materials, is designed to enhance sensitivity of the piezoelectric sensor 100 to vibrational frequencies of the ovalling mode. By ensuring that the piezoelectric sensor 100 is firmly attached and correctly positioned, the H-shaped caliper 102 facilitates the precise detection of distortions in shape of the cylindrical structure. These distortions, captured as electrical signals by the piezoelectric sensor 100, form the basis of a detailed analysis about the structural integrity of the cylindrical structure.

In the present configuration, the first caliper connector 110 and the second caliper connector 112 are connected to the cylindrical structure such that the first end 104a of the first arm 104 and the first end 106a of the second arm 106 are diametrically opposed across the cylindrical structure. Such arrangement of the first and second arms 104, 106 across the cylindrical structure ensures that the piezoelectric wire 118, which is stretched between the first wire connector 114 and the second wire connector 116, is aligned along the diameter of the cylindrical structure. This alignment provides for accurately capturing the radial expansion and contraction indicative of the ovalling mode, as it configures the piezoelectric wire 118 to directly sense the changes in diameter that occur during vibration. This arrangement further stabilizes the piezoelectric sensor 100 on the cylindrical structure, minimizing any potential movement or slippage that could distort readings of the piezoelectric sensor 100. Such positioning of the caliper connectors 110, 112 ensures that the piezoelectric sensor 100 maintains its intended orientation throughout the testing process, thereby enhancing the reliability and consistency of the data collected.

The length and material of the first arm 104 and the second arm 106 are chosen to optimize the transmission of vibrational energy to the piezoelectric elements, in the piezoelectric sensor 100. Further, the first arm 104 and the second arm 106 are designed to be long enough to provide for sufficient flexure and movement, for the piezoelectric materials to generate a measurable electrical response to the vibrations caused by the ovalling mode.

In an aspect of the present disclosure, a length of each arm 104, 106 from the crossbar 108 to each second end 104b, 106b (denoted as 'L2' in FIG. 1) is larger than a length from each caliper connector 110, 112 to the crossbar 108 (denoted as 'L1' in FIG. 1). Herein, the length 'L2' from the crossbar 108 to each second end 104b, 106b is configured to amplify the vibrations in the piezoelectric wire 118 by increasing the expansion and contraction of the distance between the first end 104a of the first arm 104 and the first end 106a of the second arm 106. Therefore, when the cylindrical structure vibrates, the second ends 104b, 106b of the arms 104, 106 move apart and together, resulting in an expansion and contraction of the distance across the diameter of the cylindrical structure. It may be appreciated that the longer the length 'L2' in the arms 104, 106, the greater the movement at the second ends 104b, 106b for a given amount of structural vibration. This amplification of movement is transferred to the piezoelectric wire 118, which in turn produces a more substantial electrical signal in response to the mechanical stress. In general, a shorter 'L1' ensures that the caliper connectors 110, 112 are close to the crossbar 108, which provides a stable base for the piezoelectric sensor 100. Meanwhile, a longer 'L2' ensures that the piezoelectric wire 118 has enough range of motion to detect even minor vibrations, thus providing a precise measurement of stiffness and integrity of the cylindrical structure.

In a further aspect of the present disclosure, the length 'L2' of each arm 104, 106 from the crossbar 108 to each second end 104b, 106b is about two times the length 'L1' from each caliper connector 110, 112 to the crossbar 108.

Such approximate doubling of the length 'L2' compared to 'L1' maximizes the mechanical advantage when vibrations occur in the cylindrical structure. As a result, small movements at the point of the caliper connectors 110, 112 are translated into larger movements at the second ends 104b, 106b of the arms 104, 106. This mechanical leverage provides the piezoelectric wire 118 with sensitivity to measure the distance changes between the second ends 104b, 106b. The greater the movement, the larger the variation in tension of the piezoelectric wire 118, leading to a more significant electrical signal when the piezoelectric wire 118 responds to the induced structural vibrations.

In an aspect of the present disclosure, a length 'H' of the crossbar 108 is equal to a diameter of the cylindrical structure. Such length 'H' of the crossbar 108 provides for a direct and uniform application of the H-shaped caliper 102 across the circumference of the cylindrical structure, ensuring that the piezoelectric sensor 100 can be precisely positioned for optimal performance. Specifically, by matching the length 'H' of the crossbar 108 to the diameter (specifically, cross-sectional diameter) of the cylindrical structure, the piezoelectric sensor 100 is aligned such that the induced vibrations from the ovalling mode are captured in their most pronounced form. Moreover, this specific design consideration facilitates the quick and easy installation of the piezoelectric sensor 100, as the crossbar 108 serves as an immediate visual and physical guide to ensure that the piezoelectric sensor 100 is correctly applied to the cylindrical structure.

In an aspect of the present disclosure, the first arm 104, the second arm 106 and the crossbar 108 are formed of metal. The utilization of metal provides the necessary rigidity and durability required for the H-shaped caliper 102, and in general the piezoelectric sensor 100, to withstand the physical stresses of operation and the environmental conditions to which it may be exposed. The choice of metal also provides for a consistent transmission of vibrational energy from the cylindrical structure to the piezoelectric wire 118, for the accurate conversion of the mechanical vibrations into the electrical signals. Moreover, the inherent properties of the metal ensure a long service life for the piezoelectric sensor 100, reducing the need for frequent replacements and thereby enhancing the overall efficiency and cost-effectiveness of use of the piezoelectric sensor 100.

Figure 3:
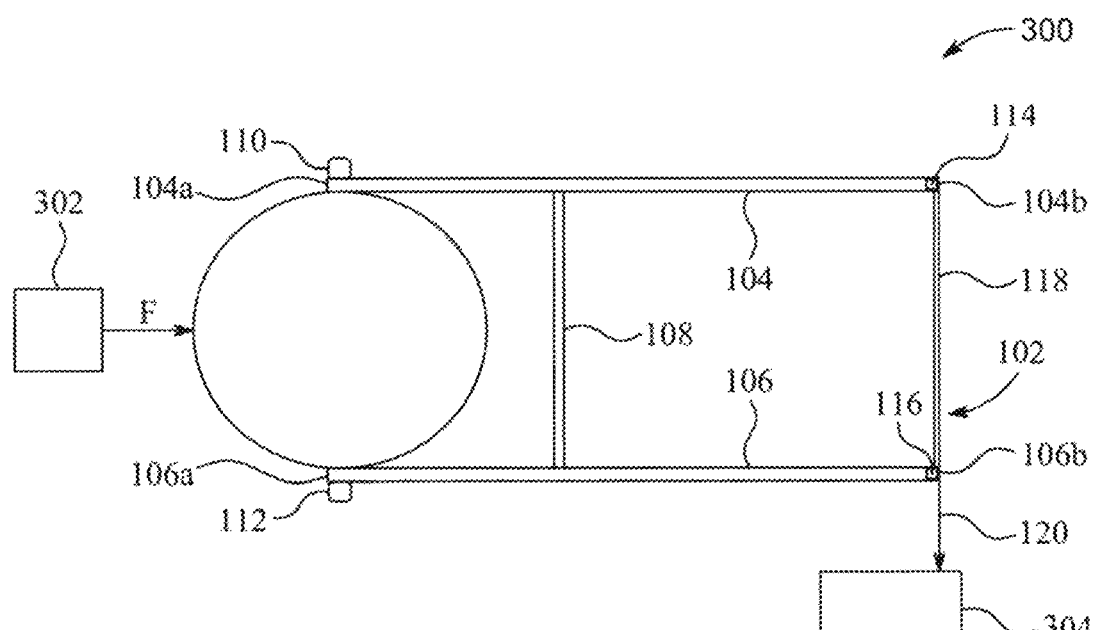
FIG. 3 is a schematic diagram of a non-destructive testing system, incorporating the piezoelectric sensor, for determining the strength condition of a cylindrical structure, according to certain embodiments.

Referring now to FIG. 3, illustrated is a schematic diagram of a non-destructive testing system (as represented by reference numeral 300) for determining the strength condition of a cylindrical structure. The non-destructive testing system 300 of the present disclosure implements the piezoelectric sensor 100, as discussed in the preceding paragraphs. The non-destructive testing system 300 has the electrical terminal 120 connected to the piezoelectric wire 118 near the second end 106b of the second arm 106. The non-destructive testing system 300 is configured to provide precise, reliable data that can inform maintenance decisions, safety evaluations, and long-term planning for infrastructure management. The non-destructive testing system 300 is designed as a portable apparatus such that assessments can be carried out regularly and efficiently, with minimal disruption to the service or function of the structure under evaluation.

As illustrated in FIG. 3, the non-destructive testing system 300 includes a transducer 302 configured to induce vibrations in the cylindrical structure. The transducer 302 is configured to provide mechanical energy, resulting in the generation of vibrational waves that propagate through the cylindrical structure. As shown, the transducer 302 is configured to apply a controlled excitation force 'F' to the cylindrical structure, thereby inducing the specific vibrational mode, namely the ovalling mode, that the piezoelectric sensor 100 is designed to detect. In present examples, the transducer 302 may be any one of a hammer, an electrodynamic shaker, a thumper, a pendulum strung from above, and the like. The placement of the transducer 302 (i.e., where the vibrations are induced) is calculated to ensure that the induced vibrations are evenly distributed across the cylindrical structure, providing a comprehensive excitation in the piezoelectric sensor 100. The transducer 302 is placed so as to impact the cylindrical structure at least 5 cm above or below the caliper. The transducer 302 is typically configured to operate over a range of frequencies to accommodate various structural dimensions and material properties. The flexibility in frequency selection ensures that the non-destructive testing system 300 can be applied to different types of cylindrical structures, from small-diameter pipes to large-scale columns, and made of diverse materials such as metal, concrete, or wood.

In an aspect of the present disclosure, the transducer 302 is a hammer and the vibrations are initiated by an impulse force generated by the hammer at a location ninety degrees from the first caliper connector 110 and opposite a position of the piezoelectric wire 118 on the cylindrical structure. That is, the transducer 302 employed within the non-destructive testing system 300 takes the form of the hammer, which is utilized to impart an impulse force to the cylindrical structure. The application of the force is done at a location that is ninety degrees from the first caliper connector 110. This specific location is chosen because it is opposite the position where the piezoelectric wire 118 is mounted on the cylindrical structure, for inducing the desired ovalling mode effectively. The impulse force generated by the hammer strike is sudden and of short duration, which is ideal for creating a broad range of frequencies necessary to excite various vibrational modes within the cylindrical structure.

In another aspect of the present disclosure, the transducer 302 is an electrodynamic shaker and the vibrations are initiated by an impulse force generated by the electrodynamic shaker at a location ninety degrees from the first caliper connector 110 and opposite a position of the piezoelectric wire 118 on the cylindrical structure. That is, employed within the non-destructive testing system 300 takes the form of the electrodynamic shaker which produces a controlled impulse force to initiate vibrations within the cylindrical structure. Similar to the hammer, the electrodynamic shaker is positioned ninety degrees from the first caliper connector 110 and opposite the piezoelectric wire 118. The electrodynamic shaker can generate a continuous range of vibrational frequencies by varying the electrical input signal, providing for a comprehensive assessment of response of the cylindrical structure across the frequency spectrum. Further, the use of the transducer 302 as the electrodynamic shaker provides for a more refined control over the frequency and amplitude of the force applied, which may be needed for cylindrical structures that require specific vibrational inputs for determining their integrity state accurately.

Herein, the electrical terminal 120 is configured to receive the electrical signal generated by vibrations in the piezoelectric wire 118 in response to expansion and contraction of a distance between the second end 104b of the first arm 104 and the second end 106b of the second arm 106 as the result of the vibrations induced in the cylindrical structure. These movements are the physical manifestations of the vibrational modes induced by the transducer 302, specifically the ovalling mode, which is a key indicator of the structural health of the cylindrical structure. The piezoelectric wire 118, reacting to the mechanical stress of the vibrations, produces the electrical signal due to the inherent properties of the piezoelectric material used therein. The electrical terminal 120 is configured to interface with the piezoelectric wire 118, ensuring the transmission of the electrical signal containing information regarding the structural integrity of the cylindrical structure.

The non-destructive testing system 300 further includes a measurement unit 304 connected to the electrical terminal 120. The measurement unit 304 is directly connected to the electrical terminal 120, providing an interface for the signals captured by the piezoelectric sensor 100. The measurement unit 304 is specifically adapted to receive the electrical signals generated by the piezoelectric wire 118 as a result of vibrations within the cylindrical structure. The measurement unit 304 is configured to receive the electrical signal, perform a frequency analysis of the electrical signal and output a stiffness value of the cylindrical structure. That is, upon receiving the electrical signals, the measurement unit 304 is configured to, first, perform a frequency analysis involving the decomposition of the electrical signal into its constituent frequencies, a process that often utilizes a Fast Fourier Transform (FFT) or similar algorithm. This is done to identify the dominant frequencies within the electrical signals which correspond to the vibrational modes of the cylindrical structure, particularly the ovalling mode that indicates the structural stiffness. Post-analysis, the measurement unit 304 processes the frequency data to output a quantifiable stiffness value for the cylindrical structure.

Figure 4:
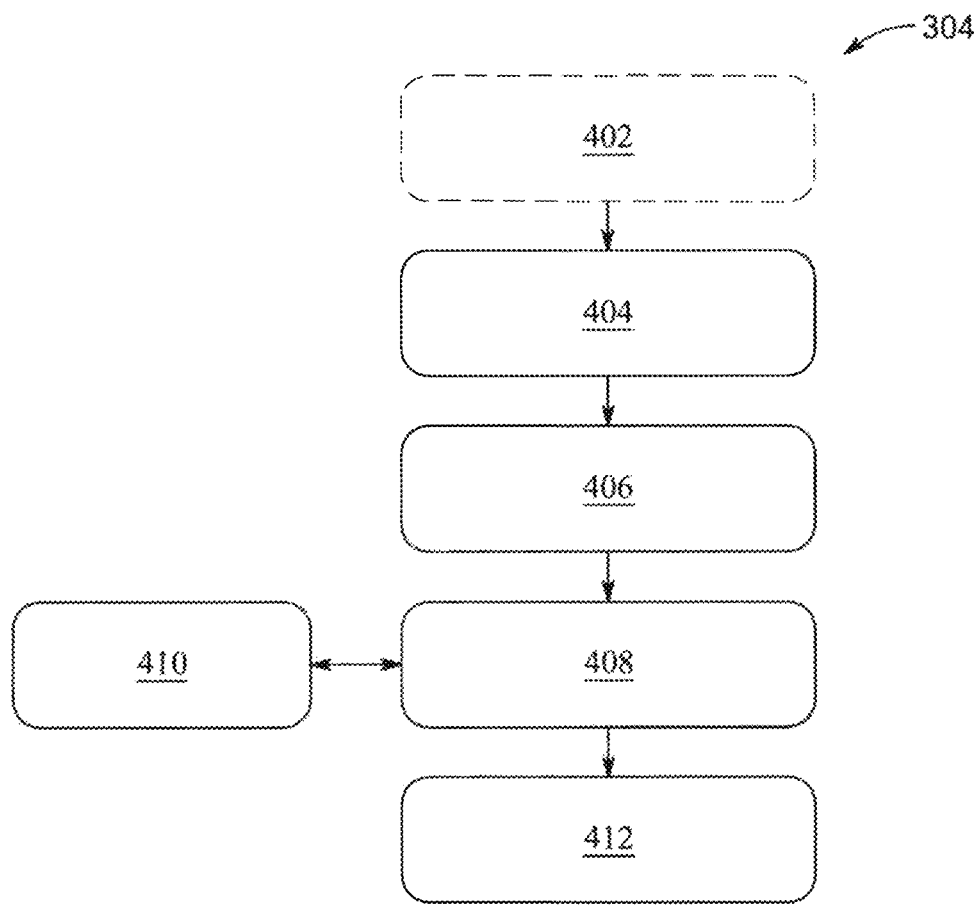
FIG. 4 is a block diagram of a measurement unit of the non-destructive testing system, according to certain embodiments.

Referring to FIG. 4, illustrated is a detailed block diagram of the measurement unit 304. As shown, in an aspect of the present disclosure, the measurement unit 304, optionally, includes an optional recorder 402 configured to store the electrical signal for off-site processing and generate a time stamp of a sampling time of the electrical signal. This recorder 402 is configured to store the electrical signals received from the piezoelectric wire 118 via the electrical terminal 120. The recorder 402 provides for off-site processing, which provides the flexibility to conduct in-depth analysis using more specialized equipment or software that may not be available or practical to use in the field. Additionally, the recorder 402, with the ability to time stamp and store the electrical signal data, can be utilized to provide a comprehensive historical analysis of the structural condition of cylindrical structure, which, in turn, can be utilized for identifying trends in behavior of the cylindrical structure, predicting potential failure points, and planning maintenance activities.

The measurement unit 304 also includes a signal amplifier 404. The signal amplifier 404 may be connected to the recorder 402 (if available). Otherwise, the signal amplifier 404 may receive the electrical signal directly from the electrical terminal 120. The signal amplifier 404 is configured to amplify the electrical signal. It may be contemplated that the electrical signal generated by the piezoelectric wire 118, which includes the vibrational characteristics of the cylindrical structure under test, may initially be of low amplitude, especially when the structural vibrations are subtle. The signal amplifier 404 ensures that these electrical signals are amplified to a level where they can be effectively processed and analyzed in the measurement unit 304. The signal amplifier 404 may be configured to amplify the electrical signal without distorting its frequency content, which is important for identifying the specific vibrational modes present in the cylindrical structure, including the ovalling mode. In present examples, the signal amplifier 404 may utilize filters and other signal conditioning features to ensure that only the relevant frequencies associated with the structural vibrations are amplified, while unwanted noise or interference is minimized.

The measurement unit 304 further includes an analog-to-digital converter 406. The analog-to-digital converter 406 is connected to the signal amplifier 404, to receive the amplified electrical signal. The analog-to-digital converter 406 is configured to transform the electrical signal to a digital signal. The transformation performed by the analog-to-digital converter 406 involves sampling the continuous analog signal at discrete intervals and quantizing amplitude of the electrical signal into digital values that can be processed by digital computing systems. This conversion provides the advanced signal processing techniques required to extract meaningful information from the vibrational data, such as frequency analysis and the identification of resonant frequencies indicative of the structural condition (as discussed in the proceeding paragraphs).

Within the non-destructive testing system 300, once the analog-to-digital converter 406 has transformed the electrical signal into the digital format, the measurement unit 304 proceeds with a series of analytical steps to assess the structural integrity of the cylindrical structure. The measurement unit 304 further includes a microcontroller 408 including circuitry and a memory including program instructions and at least one processor configured to execute the program instructions, to perform the said analytical steps. The details of the microcontroller 408 are discussed later in the description in reference to FIGS. 9-12.

The program instructions are executed to receive the digital signal. That is, the electrical signal, as converted to digital form, is received from the analog-to-digital converter 406. This digital signal, a result of converting the analog electrical signal generated by the piezoelectric wire 118 through the analog-to-digital converter 406, includes the vibrational data of the cylindrical structure under investigation.

The program instructions are further executed to perform a fast Fourier transform on the digital signal and generate a frequency spectrum of the digital signal. That is, initially, the measurement unit 304 performs a Fast Fourier Transform (FFT) on the digitized electrical signal, converting the time-domain signal into a frequency spectrum. This frequency spectrum represents the signal in terms of its constituent frequencies and their respective amplitudes, providing a detailed view of the vibrational characteristics of the cylindrical structure.

The program instructions are further executed to perform a frequency analysis of the frequency spectrum to determine a resonance frequency of an ovalling mode. That is, following the generation of the frequency spectrum, the measurement unit 304 is configured for frequency analysis specifically aimed at identifying the resonance frequency associated with the ovalling mode. The ovalling mode, characterized by the expansion and contraction of the cylindrical structure, is an indicator of the structural health and stiffness. Identifying the resonance frequency of the ovalling mode provides the inherent physical properties of the cylindrical structure and can indicate the presence of potential structural weaknesses or damages.

In an aspect of the present disclosure, the frequency analysis is configured to identify the resonance frequency of the ovalling mode based on a second harmonic of the electrical signal. The second harmonic, being twice the frequency of the fundamental vibrational mode, provides a more distinct signature of the ovalling mode, to help differentiate from other vibrational modes that may be present in the cylindrical structure. This further helps in mitigating the potential for interference from external noise, thereby improving the reliability and accuracy of the testing process. Therefore, by focusing on the second harmonics, the frequency analysis can more accurately isolate resonance frequency of the ovalling mode, thereby enhancing the precision of the structural assessment.

In an example, the frequency spectrum is configured to range from 20 to 2000 Hz. For this purpose, the frequency spectrum generated by the Fast Fourier Transform (FFT) of the digital signal is specifically configured to cover a range from 20 to 2000 Hz. This range is selected to cover the typical frequencies at which the resonant modes of cylindrical structures, including the ovalling mode, are expected to occur. It may be understood that the choice of this frequency range is based on empirical data and theoretical models that suggest most resonant frequencies of interest for common cylindrical structures, such as construction columns, pillars, and logs, fall within this spectrum.

The program instructions are further executed to match the resonance frequency of the ovalling mode to a database (as represented by reference numeral 410) including records of frequencies of known ovalling modes versus stiffness values of cylindrical structures having a same cross-sectional size and a same material. Herein, the database 410 is in signal communication with the microcontroller 408. The database 410 is a repository that contains records of frequencies corresponding to known ovalling modes, each corresponding to stiffness values for cylindrical structures that share the same cross-sectional size and material composition. It may be understood that the records within the database 410 are derived from empirical data and theoretical models, including a wide range of cylindrical structures made from various materials. The inclusion of the database 410 within the non-destructive testing system 300 helps in translating the vibrational data into meaningful insights regarding the structural integrity of the cylindrical structure under examination. The microcontroller 408 retrieves the resonance frequency identified from the frequency spectrum and queries the database 410 to find a corresponding record. This record provides a reference stiffness value, based on correlation of the resonance frequency with the stiffness of similar structures in the database. By comparing the identified frequency with the reference stiffness value, the microcontroller 408 is configured to determine the stiffness of the cylindrical structure to provide a quantitative assessment of its structural condition.

The program instructions are further executed to display the stiffness value on a display (as represented by reference numeral 412) of the measurement unit 304. The display 412 serves as the user interface, presenting the analyzed data in a clear and accessible manner, configuring operators, or other users to easily interpret the findings of the test. The display can be configured to show the stiffness value in various formats, such as numerical readings, graphical representations, or alongside other relevant structural health indicators, depending on the requirements of the users.

In an aspect of the present disclosure, the measurement unit 304 includes a frequency analyzer (not shown) configured to perform the frequency analysis of the electrical signal, determine an ovalling mode of the vibrations from the frequency analysis, match the frequency of the ovalling mode to a database record (such as, the record from the database 410) including ovalling modes versus stiffness values of cylindrical structures, and output the stiffness value onto the display 412 of the measurement unit 304. This frequency analyzer may receive the amplified electrical signal directly from the signal amplifier (such as, the signal amplifier 404). The frequency analyzer may perform the functions similar to that of the microcontroller 408, as discussed in the proceeding paragraphs, to provide the stiffness value for the cylindrical structure under examination.

Figure 5:
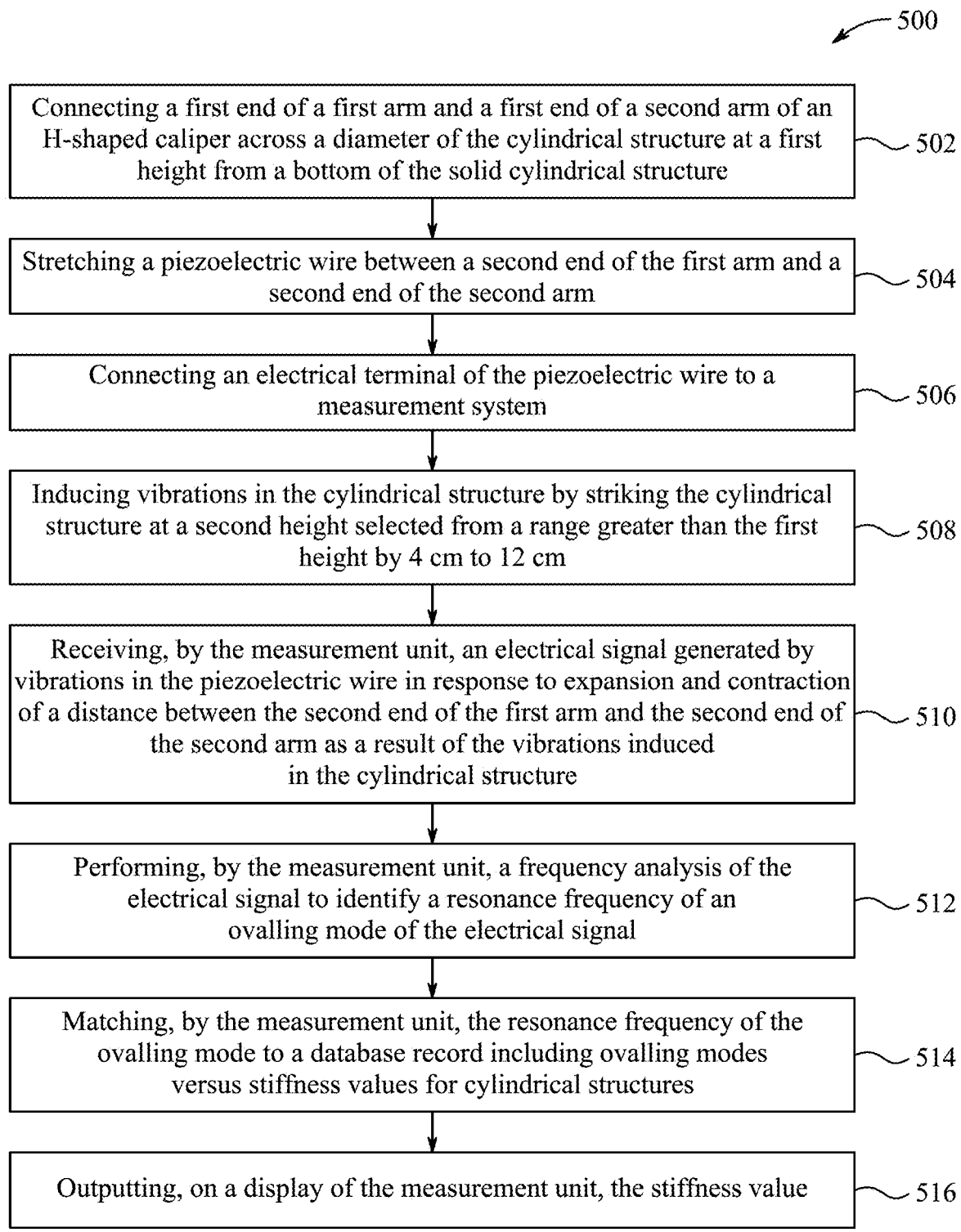
FIG. 5 is an exemplary flowchart of a method for non-destructive testing of a cylindrical structure, according to certain embodiments.

The present disclosure further provides a method for non-destructive testing of a cylindrical structure. Referring to FIG. 5, illustrated is a flowchart listing steps involved a method (as represented by reference numeral 500) for the non-destructive testing of the cylindrical structure. These steps are only illustrative, and other alternatives can also be provided where one or more steps are added, one or more steps are removed, or one or more steps are provided in a different sequence without departing from the scope of the claims herein. Various aspects and variants disclosed above, with respect to the aforementioned piezoelectric sensor 100 and the non-destructive testing system 300 apply mutatis mutandis to the method 500, as discussed in the proceeding paragraphs.

At step 502, the method 500 includes connecting the first end 104*a* of the first arm 104 and the first end 106*a* of the second arm 106 of the H-shaped caliper 102 across the diameter of the cylindrical structure at a first height from a bottom of the solid cylindrical structure. This establishes the positioning of the piezoelectric sensor 100, ensuring its precise alignment with the cylindrical structure for optimal detection of vibrational modes. The first ends 104*a* and 106*a* of the arms 104 and 106, respectively, are securely affixed to the surface of the cylindrical structure, spanning its diameter. In an example, the first ends 104*a* and 106*a* of the arms 104 and 106, respectively, are attached by bolts or screws drilled into the cylindrical structure. The choice of the first height for the placement of the H-shaped caliper 102 is determined based on factors such as the expected distribution of vibrational modes along the length of the cylindrical structure and the need to avoid interference from boundary conditions at ends of the cylindrical structure. In an example for a construction column, the H-shaped caliper 102 may preferably be located at a height of a few feet over the ground or at a height corresponding to ⅓ of height of the construction column (for a relatively short building element). Such configuration provides for effective sensing of the ovalling mode, as the piezoelectric wire 118 is stretched between the second ends 104*b*, 106*b* of the arms 104, 106 to directly intercept the radial expansions and contractions characteristic of the ovalling mode in the cylindrical structure.

At step 504, the method 500 includes stretching the piezoelectric wire 118 between the second end 104*b* of the first arm 104 and the second end 106*b* of the second arm 106. This provides for the operational setup of the piezoelectric sensor 100, as the tension applied to the piezoelectric wire 118 provide it with ability to sense and convert mechanical vibrations into electrical signals. Further, the positioning of the piezoelectric wire 118, spanning between the second ends 104*b*, 106*b* of the arms 104, 106, provides for optimal capturing of the vibrational energy, maximizing sensitivity of the piezoelectric sensor 100 to the structural dynamics of the cylindrical structure.

At step 506, the method 500 includes connecting the electrical terminal 120 of the piezoelectric wire 118 to the measurement unit 304. This connection provides for the transmission of the electrical signals generated by the piezoelectric wire 118 in response to structural vibrations to the electrical terminal 120. The electrical terminal 120 serves as the interface between the piezoelectric sensor 100 and the measurement unit 304, where the electrical signal is further processed and analyzed. This ensures that the vibrational data captured by the piezoelectric wire 118 is accurately relayed to the measurement unit 304, for analysis of resonant frequencies of the cylindrical structure and, by extension, its structural integrity.

At step 508, the method 500 includes inducing vibrations in the cylindrical structure by striking the cylindrical structure at a second height selected from a range greater than the first height by 4 cm to 12 cm. Such procedure initiates the vibrational modes within the cylindrical structure, particularly targeting the ovalling mode for the assessment of stiffness of the cylindrical structure. The selection of the second height, slightly above the position of the H-shaped caliper 102, ensures that the induced vibrations propagate effectively through the cylindrical structure, engaging the piezoelectric wire 118. This height differential enhances the vibrational response of the cylindrical structure, ensuring that the piezoelectric sensor 100 can effectively detect the resonant frequencies indicative of its stiffness.

In an example, the method 500 involves inducing vibrations in the cylindrical structure by applying a stress pulse radially. This impulse is designed to encompass the frequencies of the lowest natural vibrational modes of the cylindrical structure, particularly focusing on those modes that exhibit vibration amplitudes along circumference of the cylindrical structure. Among these modes, the ovalling mode, characterized by a bending wavelength about half the circumference of the cylinder, is given special consideration.

At step 510, the method 500 includes receiving, by the measurement unit 304, the electrical signal generated by vibrations in the piezoelectric wire 118 in response to expansion and contraction of a distance between the second end 104b of the first arm 104 and the second end 106b of the second arm 106 as a result of the vibrations induced in the cylindrical structure. This captures the vibrational data for assessing the structural integrity of the cylindrical structure. Herein, the electrical signal corresponds to the dynamic response of the cylindrical structure to the induced vibrations, and thus includes information on the vibrational modes, including the ovalling mode.

At step 512, the method 500 includes performing, by the measurement unit 304, a frequency analysis of the electrical signal to identify a resonance frequency of an ovalling mode of the electrical signal. This frequency analysis is employed for isolating the specific vibrational mode associated with the structural stiffness of the cylindrical structure. By identifying the resonance frequency of the ovalling mode, the measurement unit 304 is configured to determine the structural health and integrity of the cylindrical structure, providing insights into any potential weaknesses or deteriorations.

At step 514, the method 500 includes matching, by the measurement unit 304, the resonance frequency of the ovalling mode to a database record including ovalling modes versus stiffness values for cylindrical structures. This matching process involves comparing the identified resonance frequency with the reference records in the database 410 that correlates to known ovalling mode frequencies with corresponding stiffness values for various cylindrical structures. This comparison configures the measurement unit 304 to determine the stiffness value of the cylindrical structure under test, based on the resonance frequency of its ovalling mode.

In an example, from charts established for the resonance frequencies of the ovalling mode in sound cylindrical elements of same geometrical shape and made of the same material as the investigated cylindrical structure, comparison can be made between the value of the measured frequency and the ones on the chart according to the cross-sectional size of the cylindrical structure. In another example, from charts established for the resonance frequencies of the ovalling mode in sound cylindrical elements comparison can be made between the value of the measured frequency and the ones on the chart according to the cross-sectional size of the cylindrical structure and the material of its composition.

At step 516, the method 500 includes outputting, on the display 412 of the measurement unit 304, the stiffness value. Upon determination of the stiffness value, the method 500 involves visually presenting the stiffness value on the display 412, providing indication of the structural integrity of the cylindrical structure. The displayed stiffness value offers valuable feedback to the users, such as, but not limited to, inspectors and maintenance personnel, and configure them to make informed decisions regarding safety, maintenance requirements, or suitability for continued use for the cylindrical structure.

In an aspect of the present disclosure, the method 500 further includes storing, by the recorder 402, the electrical signal. This involves capturing the electrical signal generated by the piezoelectric wire 118 as it responds to the vibrational dynamics of the cylindrical structure. This process preserves the raw vibrational data, providing for subsequent off-site analysis or archiving for historical records. The method 500 further includes generating, by the measurement unit 304, a time stamp of a sampling time of the electrical signal. This involves contextualizing the data collected during the testing process. The time stamp provides a chronological record for each data point, facilitating the correlation of the vibrational data with specific testing conditions, external events, or subsequent tests. The method 500 further includes amplifying, by the signal amplifier 404 connected to the recorder 402, the electrical signal. The signal amplifier 404 boosts the amplitude of the electrical signal without distorting its essential characteristics, maintaining the integrity of the vibrational information it carries. This amplification ensures that even subtle vibrational modes, which may be indicative of early-stage structural issues, are not lost in the noise. The method 500 further includes transforming, by an analog-to-digital converter 406 connected to the signal amplifier 404, the electrical signal to the digital signal. This process configures the digital processing and analysis of the vibrational data. This transformation involves sampling the analog signal at discrete intervals and converting these samples into digital values, facilitating the application of advanced signal processing techniques to extract meaningful insights from the data. The method 500 further includes receiving, by the microcontroller 408 including circuitry and the memory including program instructions and the at least one processor configured to execute the program instructions, the digital signal. Herein, the microcontroller 408 is configured to process the digital signal according to predefined algorithms and analysis routines embedded within its program instructions. The method 500 further includes performing, by the processor, a fast Fourier transform on the digital signal and generating a frequency spectrum of the digital signal. The FFT algorithm decomposes the time-domain digital signal into its constituent frequencies, producing the frequency spectrum that provides the vibrational characteristics of the cylindrical structure, including the presence of the ovalling mode. The method 500 further includes performing, by the frequency analyzer, a frequency analysis of the frequency spectrum to determine a resonance frequency of the ovalling mode. This involves examining the frequency spectrum to isolate the specific frequency associated with the ovalling mode, for identifying the vibrational signature that correlates with the structural stiffness of the cylindrical structure. The method 500 further includes matching, by the microcontroller, the resonance frequency of the ovalling mode to the database 410 including records of frequencies of known ovalling modes versus stiffness values of cylindrical structures having a same cross-sectional size and a same material. This matching configures to infer the stiffness value of the cylindrical structure under test by relating its vibrational characteristics to those of known structures in the database 410. The method 500 further includes displaying, on the display 412 of the measurement unit 304, the stiffness value. The display 412 provides immediate feedback on condition of the cylindrical structure, facilitating informed decision-making regarding maintenance, repair, or further investigation needs.

In an aspect of the present disclosure, the method 500 further includes determining, by the measurement unit 304, a structural integrity of the cylindrical structure from the stiffness value. This involves analyzing the inferred stiffness value in relation to established thresholds for structural health. Herein, the stiffness value, derived from the resonance frequency of the ovalling mode, is interpreted in the context of the material properties, geometric dimensions, and expected performance criteria of the cylindrical structure. The measurement unit 304 utilizes the stiffness value as the indicator of the structural integrity, assessing whether the cylindrical structure remains within safe operational limits or exhibits signs of degradation that could compromise its functionality and safety. The method 500 further includes generating, by the measurement unit 304, a structural integrity report. The structural integrity report may include data, including the stiffness value, the comparison against reference values from the database 410, and the resultant determination of the structural integrity. The structural integrity report may also include recommendations for further actions, such as maintenance, monitoring, or repair, based on the assessed condition of the cylindrical structure. The method 500 further includes outputting the structural integrity report of the cylindrical structure on the display 412. This provides immediate accessibility to the assessment results, configuring for on-site review and decision-making.

In an aspect of the present disclosure, the method 500 further includes determining, from the frequency analysis, an amplitude of the resonance frequency of the ovalling mode. This involves examination of the frequency spectrum generated by the FFT of the digital signal to understand the vibrational characteristics of the cylindrical structure, as the amplitude of the resonance frequency provides insights into the ovalling mode within vibrational behavior of the cylindrical structure. The method 500 further includes generating, by the measurement unit 304, a computer model of the cylindrical structure based on the frequency analysis. This computer model incorporates the identified resonance frequencies, including that of the ovalling mode, and their corresponding amplitudes, providing a comprehensive simulation of the vibrational behavior of the cylindrical structure. The method 500 further includes comparing the computer model to a reference database record of ovalling mode frequencies and ovalling mode amplitudes of the cylindrical structure (for example, as function of cross-sectional size like perimeter or average diameter). Such comparison validates the accuracy of the computer model and for interpreting its findings in the context of known structural behaviors. By matching resonance frequencies and amplitudes of the computer model against the database records, the degree to which the structure conforms to expected norms is evaluated. The resultant computer model serves as a virtual prototype, providing detailed analysis and visualization of response of the cylindrical structure to vibrational stimuli, for diagnosing structural issues and planning remedial actions.

In an aspect of the present disclosure, the method 500 further includes generating, by the measurement unit 304, a graph which represents the resonance frequencies of ovalling modes as a function of cross-sectional diameters of cylindrical structures. This graph serves as a diagnostic tool, providing the identification of trends and patterns in how the resonance frequencies vary with changes in cross-sectional diameters of the cylindrical structures. The method 500 further includes comparing, by the measurement unit 304, the resonance frequency of the ovalling mode of the computer model to the graph. This involves aligning the specific resonance frequency obtained from the digital simulation of vibrational behavior of the cylindrical structure with the broader trends depicted in the graph. Such comparison provides for the contextualization of vibrational response of the cylindrical structure within the spectrum of expected behaviors for structures of similar dimensions and materials. The method 500 further includes determining, by the measurement unit 304, a degree of strength weakening factors of the cylindrical structure. This determination is based on the analysis of the resonance frequencies and their comparison to established references, providing for the quantification of the impact of factors such as material processing (casting, filling, tempering, cooling, and the like), environmental influences, or physical damages (corrosion, flaws, rot, and the like) on overall strength and stability of the cylindrical structure. The method 500 further includes generating, by the measurement unit 304, a report of a structural integrity of the cylindrical structure based on the degree of strength weakening factors. This report outlines the vibrational characteristics of the cylindrical structure, the degree to which strength-weakening factors may be affecting its integrity, and recommendations for further action. The method 500 further includes displaying, on the display 412 of the measurement unit 304, the report of the structural integrity. Such display of the structural integrity report provides for immediate interpretation of the results and facilitates informed decision-making regarding the management and maintenance of the cylindrical structure under examination.

For purposes of the present disclosure, the cylindrical structure is one of a solid cylindrical structure and a hollow cylindrical structure. That is, the present method 500 can be applied to broad spectrum of cylindrical structures, including solid cylindrical structures as well as hollow cylindrical structures, such as a construction column, a wooden pole, a log, a tree trunk, a bridge pile or a pipe for transporting oil or gas. The method 600 may also be of extended application to similarly shaped elements as may be used for bearing of telephone or electricity cables, and in standing trees, and which may be affected by the attack of rot or parasites. The solid cylindrical structures, such as concrete pillars or metal rods, are characterized by their uniform material composition throughout their cross-section, which influences their vibrational modes and resonance frequencies in specific ways. On the other hand, the hollow cylindrical structures, like pipes or tubes, have an empty space or cavity along their central axis, which significantly affects their dynamic behavior in different ways. By accommodating both solid and hollow configurations, the method 500 is configured to provide reliable assessments of structural integrity, regardless of the specific type of cylindrical structure being evaluated.

To summarize, in an exemplary scenario, to perform the test, an operator makes note of the material and diameter of the test cylinder. The operator then instructs the computer in the measurement unit 304, by means of a simple keyboard operation, about the test specimen characteristics (material, diameter). The operator then sets the test specimen under investigation into vibration by means of a hammer of appropriate size and suitable tip hardness in order to excite the ovalling mode of vibration. The hammer impact may be at any location on the test specimen but is preferably to be at a few feet up from the ground-line and in a radial direction. The arms 104, 106 of the H-shaped caliper 102 are firmly attached on opposite sides of the test specimen, on either side of the hammer impact site, i.e. at ninety degrees clockwise and anti-clockwise respectively from the radial direction of impact direction of the hammer. The piezoelectric wire 118 transports the test-signal to the recorder 402 if later analysis is wished at another place. Should on-site measurements be made, then the recorder 402 can be by-passed and analog test-signal is converted to the digital signal on which a Fourier transform is applied on a laptop hosting software and analysis system. The amplitude of the resulting frequency response, as then processed by the software in the laptop computer, is then studied and the resonance frequency of the ovalling mode is read and compared to corresponding value on a standard curve drawing the frequency of the ovalling mode as a function of cross-sectional size of the test specimen. The relative decrease of the resonance frequency of the ovalling mode, then, provides the stiffness value of the cylindrical test specimen hence classifying it as sound, acceptable, weak or to be discarded.

The use of the transducer 302 is for generating electrical signals, in the form of voltages, translating the vibratory surface motion of the specimen under test. The transient signal recorded by the transducer 302 is conveyed to the recorder 402 or the microcontroller 408 (or frequency analyzer). The signal may also be analyzed on-site, as it may be recorded for further processing and analysis later. At a suitable later time and location, the recorded signal of the test specimen may be played back into the analog-to-digital converter 406, which digitizes and converts the signal into a form that is usable by computer hardware and software for this purpose. The signal is afterwards fed into the microcontroller 408 (computer) equipped with analysis software operating on digitized data and which executes the FFT on the signal. The FFT operation results in a frequency response, or a transfer function (TF), a translation of the signal into the frequency domain. The resonant frequencies are then read on the graph of the amplitude of the TF and the frequency of the ovalling mode is identified. The computer also has a routine to determine the stiffness condition of the test specimen depending on the material making the cylindrical test object and its cross-sectional dimension given either as its perimeter or its average diameter at the positions of the transducer 302.

Figure 6:
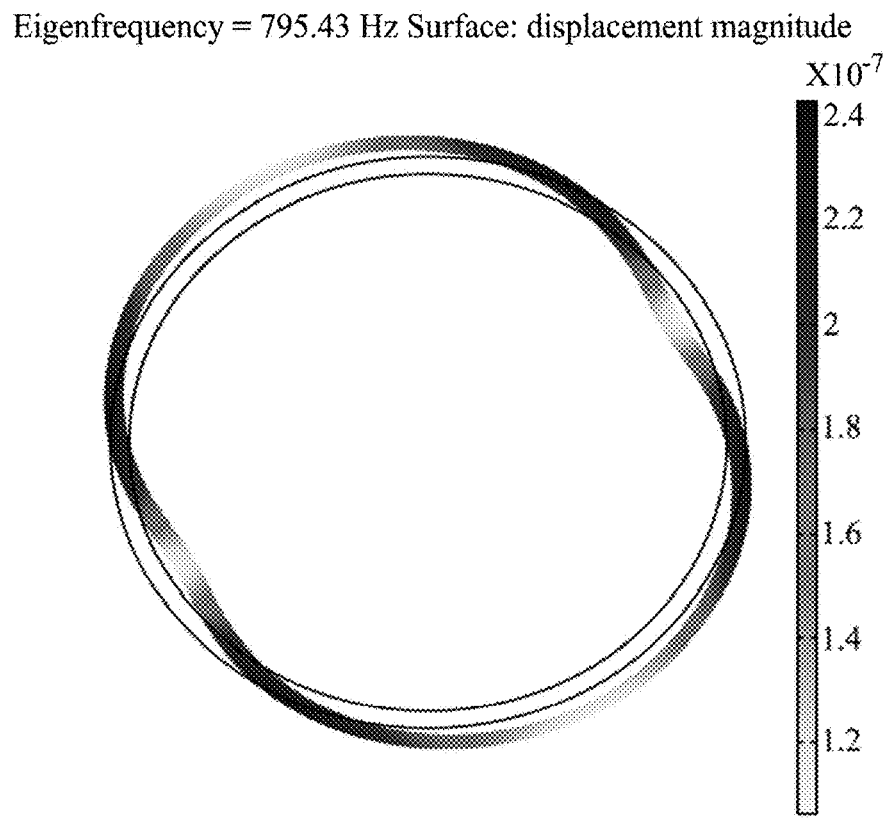
FIG. 6 is an exemplary illustration of a numerical simulation of a finite length hollow cylinder vibrating for 2-dimensional case, according to certain embodiments.
Figure 7:
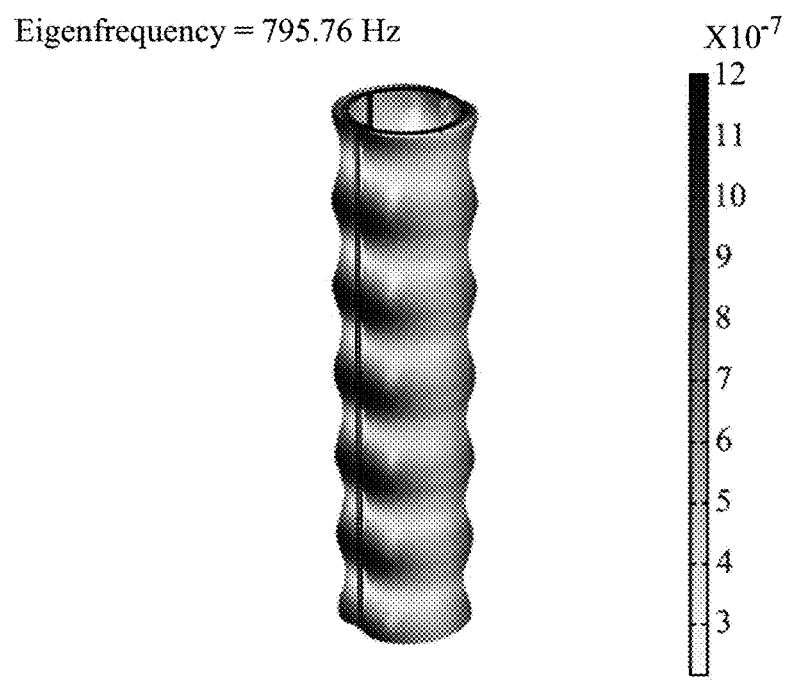
FIG. 7 is an exemplary illustration of a numerical simulation of a finite length hollow cylinder for 3-dimensional case, according to certain embodiments.

Referring now to FIGS. 6 and 7, depicted are results of a numerical simulation using a COMSOL-MATLAB code for the n=2 circumferential mode in a finite length hollow cylinder vibrating in free-free boundary conditions. In particular, the depiction of FIG. 6 corresponds to 2-dimensional case, for cross-section displacement, with frequency of vibration (FoV) being 795 Hz, and the depiction of FIG. 7 corresponds to 3-dimensional case, for overall cylinder behavior, with FoV being 796 Hz. A numerical simulation was performed to model the n=2 circumferential vibration mode of a hollow cylindrical structure, specifically a PVC pipe with precise diameter and wall thickness measurements. The simulation provided a visual representation of vibrational behavior of the cylindrical structure, both in a cross-sectional view and as a complete entity. The computational analysis was executed using finite element method (FEM) software, integrating COMSOL with MATLAB, to accurately depict the vibrational response of the PVC material structure. In the cross-sectional depiction of FIG. 6, the vibration mode resembles an "8-figure" shape, noticeably more oval and constricted at opposing ends than a simple elliptical pattern. This distinct shape is indicative of the ovalling mode, which is characterized by its double-lobed deformation pattern, contrasting with the initial elliptical assumption. Additionally, the full-body representation of the cylindrical structure in FIG. 7 reveals a periodic vibration pattern along its axis. This pattern may be attributed to the Poisson effect in the compression-expansion of the material during vibration.

Figure 8:
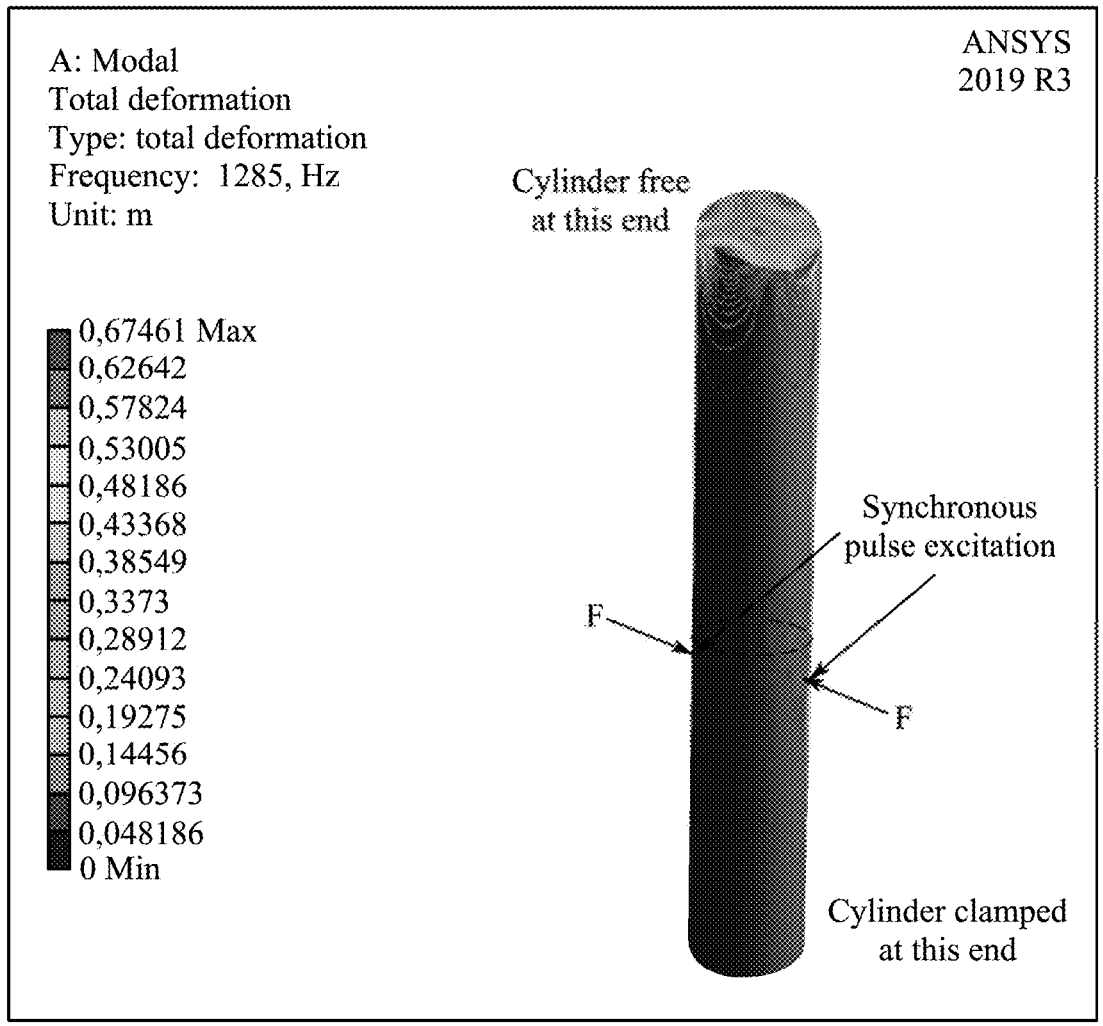
FIG. 8 is an exemplary illustration of a numerical simulation of a clamped-free solid isotropic cylinder, according to certain embodiments.

Referring to FIG. 8, depicted is a result of a numerical simulation of the ovalling mode in a clamped-free solid isotropic cylinder subject to a pair of synchronous identical radial force pulses applied to its midst. The cylindrical structure's characteristics are defined by a height of 3.00 meters, a diameter of 0.45 meters, a material density (p) of 490 kilograms per cubic meter, and a modulus of elasticity (MoE) of 750 megaPascals (MPa), providing a comprehensive representation of the vibrational response in a clamped-free boundary condition scenario. This represents a finite element method (FEM) based numerical simulation of a solid isotropic cylindrical structure with wood-like material properties, subjected to a pair of synchronous, identical radial force pulses (indicated by 'F') at its midpoint. This simulation represents the behavior of the cylinder when one end is clamped, restricting both translational and rotational movement, while the other end is free, providing for movement. The depiction details the overall motion of the cylinder, including the distinct pattern for n=2 cross-sectional mode, particularly visible at the surface of the free end, despite the excitation being applied at the midpoint.

The system and methods of the present disclosure take advantage of the observation that the resonant frequency of radial extension mode of second order, the ovalling mode, in a round cylinder, depends on the transversal size of the cylinder and on whether it is solid or hollow. Typically, for building elements the resonant frequency takes values less than 2000 Hz and is dependent on the strength condition of the test specimen. A predictable shift in the magnitude of these resonant frequencies towards lower values occurs as the condition of the piece under test deteriorates due to a reduced stiffness resulting from the activity of strength-weakening factors like rust in metals, corrosion in reinforced concrete or decay fungi and insects in wood. The relative shift in the magnitude of the resonant frequencies of the ovalling mode is directly related to the extent of material strength deterioration. For materials with homogeneous and isotropic physical characteristics such as metals, a mathematical model for the exact expression of this relative change may be determined. However, for materials with varying characteristics such as wood, it is relatively hard to formulate a mathematical model due to the wide variety of wood species and resulting from their growth under widely varying climate conditions and ground types.

The resonant frequency of the ovalling mode of the specimen under investigation can be determined through a measurement of its surface vibrations by means of the piezoelectric sensor 100 using the piezoelectric wire 118. The piezoelectric wire 118 is stretched and attached to the ends of two metallic arms, the two other ends of which are attached immobilized on the cylinder at two diametrically opposed positions. In the laboratory, setting the test piece under vibration can be made by attaching an electro-dynamic shaker while on the field this may be made through a stroke from a hammer or similar device. The analog signal collected by the piezoelectric sensor 100 is then conveyed to the measurement unit 304 to be digitized for processing and analysis. The processing includes submitting the digitized signal to a Fast discrete Fourier Transform, and from the amplitude of which the resonant frequencies may be determined. Alternatively, the analog vibration signal can be stored on a tape or on a digital medium to be replayed for processing and analysis at a later opportunity.

The tension of the piezoelectric wire of the H-shaped caliper 102 after installation on the cylindrical wire may be calibrated by hanging a weight at the center of the wire and measuring the changes in the height due to the weight. Alternatively, the installed H-shaped caliper 102 may be calibrated by analyzing the application of a precise force by the transducer upon the cylinder versus the amplitude of the received signal. The tension in the piezoelectric wire is directly related to the amplitude of the received signal. Reference can be made to the database 410 or to a handheld chart (in the field) to determine when the amplitude of the received signal is of sufficient magnitude for accurate testing.

In order to differentiate between the various vibration modes of the specimen under test, and more specifically to isolate the ovalling mode from the overall frequency response, use is made of the piezoelectric sensor 100 with the piezoelectric wire 118 attached after stretching it between two points on the cylinder positioned diametrically on the surface of cylinder. In this respect, the surface vibrations on these positions are in phase for the ovalling mode of vibration, or any other circumferential mode of even order, i.e. the vibrations at these two positions are simultaneously at the same amplitude, for instance at a maximum of vibration, or at a minimum vibration at an odd number of half periods later (the period of vibration is simply the inverse of the resonance frequency).

The present disclosure provides an accurate, effective, and relatively inexpensive technique for inspecting building elements of cylindrical shape, and the corresponding procedure for analysis and for giving the final assessment on the health status of the tested specimen. A portable apparatus can also be presented for this end, and which consists of a laptop computer and the hardware/software to be used for the digital conversion and analysis of the analog signal recorded from the specimen under inspection. The application of the present disclosure can be made to cylindrical specimens of any solid material, either filled or hollow. Examples of elements to which the technique can be applied are construction columns, pillars, tree trunks, logs and poles of circular cylindrical shape. The present disclosure provide for the detection of defects, either structural or resulting from strength weakening process operating within the material, for elements of cylindrical shape.

The first embodiment describes the piezoelectric sensor 100 for sensing the ovalling mode in the cylindrical structure. The piezoelectric sensor 100 comprising: the H-shaped caliper 102 comprising the first arm 104, the second arm 106 and the crossbar 108 connected to and perpendicular to the first arm 104 and the second arm 106; the first caliper connector 110 located near the first end 104a of the first arm 104; the second caliper connector 112 located near the first end 106a of the second arm 106; the first wire connector 114 located near the second end 104b of the first arm 104; the second wire connector 116 located near the second end 106b of the second arm 106; the piezoelectric wire 118 connected to the first wire connector 114 and the second wire connector 116, wherein the piezoelectric wire 118 is stretched between the first wire connector 114 and the second wire connector 116; and the electrical terminal 120 connected to the piezoelectric wire 118 at the second wire connector 116, wherein the electrical terminal 120 is configured to receive the electrical signal generated by the piezoelectric wire 118 in response to expansion and contraction of the distance between the second end 104b of the first arm 104 and the second end 106b of the second arm 106 as the result of vibrations induced in the cylindrical structure.

In an aspect of the piezoelectric sensor 100, the first caliper connector 110 and the second caliper connector 112 are connected to the cylindrical structure such that the first end 104a of the first arm 104 and the first end 106a of the second arm 106 are diametrically opposed across the cylindrical structure.

In an aspect of the piezoelectric sensor 100, the length 'L2' of each arm 104, 106 from the crossbar 108 to each second end 104b, 106b is larger than the length 'L1' from each caliper connector 110, 112 to the crossbar 108, wherein the length 'L2' from the crossbar 108 to each second end 104b, 106b is configured to amplify the vibrations in the piezoelectric wire 118 by increasing the expansion and contraction of the distance between the first end 104a of the first arm 104 and the first end 106a of the second arm 106.

In an aspect of the piezoelectric sensor 100, the length 'H' of the crossbar 108 is equal to the diameter of the cylindrical structure.

In an aspect of the piezoelectric sensor 100, the length 'L2' of each arm 104, 106 from the crossbar 108 to each second end 104b, 106b is about two times the length 'L1' from each caliper connector 110, 112 to the crossbar 108.

In an aspect of the piezoelectric sensor 100, the first arm 104, the second arm 106 and the crossbar 108 are formed of metal.

The second embodiment describes the non-destructive testing system 300 for determining the strength condition of the cylindrical structure. The non-destructive testing system 300 comprising: the transducer 302 configured to induce vibrations in the cylindrical structure; the piezoelectric sensor 100 including: the H-shaped caliper 102 comprising the first arm 104, the second arm 106 and the crossbar 108 connected to and perpendicular to the first arm 104 and the second arm 106, wherein the length 'H' of the crossbar 108 is equal to the cross-sectional diameter of the cylindrical structure; the first caliper connector 110 located near the first end 104a of the first arm 104; the second caliper connector 112 located near the first end 106a of the second arm 106; the first wire connector 114 located near the second end 104b of the first arm 104; the second wire connector 116 located near the second end 106b of the second arm 106; the piezoelectric wire 118 connected to the first wire connector 114 and the second wire connector 116, wherein the piezoelectric wire 118 is stretched between the first wire connector 114 and the second wire connector 116; and the electrical terminal 120 connected to the piezoelectric wire 118 near the second end 106*b* of the second arm 106, wherein the electrical terminal 120 is configured to receive the electrical signal generated by vibrations in the piezoelectric wire 118 in response to expansion and contraction of the distance between the second end 104*b* of the first arm 104 and the second end 106*b* of the second arm 106 as the result of the vibrations induced in the cylindrical structure; and the measurement unit 304 connected to the electrical terminal 120, wherein the measurement unit 304 is configured to receive the electrical signal, perform the frequency analysis of the electrical signal and output the stiffness value of the cylindrical structure.

In an aspect of the non-destructive testing system 300, the measurement unit 304 comprises: the signal amplifier 404 configured to amplify the electrical signal; and the frequency analyzer configured to perform the frequency analysis of the electrical signal, determine the ovalling mode of the vibrations from the frequency analysis, match the frequency of the ovalling mode to the database record including ovalling modes versus stiffness values of cylindrical structures, and output the stiffness value onto the display 412 of the measurement unit 304.

In an aspect of the non-destructive testing system 300, the measurement unit 304 comprises: the recorder 402 configured to store the electrical signal for off-site processing and generate the time stamp of the sampling time of the electrical signal.

In an aspect of the non-destructive testing system 300, the measurement unit 304 comprises: the recorder 402 configured to store the electrical signal and generate the time stamp of the sampling time of the electrical signal; the signal amplifier 404 connected to the recorder 402, wherein the signal amplifier 404 is configured to amplify the electrical signal; the analog-to-digital converter 406 connected to the signal amplifier 404, wherein the analog-to-digital converter 406 is configured to transform the electrical signal to the digital signal; the microcontroller 408 including circuitry and the memory including program instructions and at least one processor configured to execute the program instructions to: receive the digital signal; perform the fast Fourier transform on the digital signal and generate the frequency spectrum of the digital signal; perform the frequency analysis of the frequency spectrum to determine the resonance frequency of the ovalling mode; match the resonance frequency of the ovalling mode to the database 410 including records of frequencies of known ovalling modes versus stiffness values of cylindrical structures having the same cross-sectional size and the same material; and display the stiffness value on the display 412 of the measurement unit 304.

In an aspect of the non-destructive testing system 300, the frequency analysis is configured to identify the resonance frequency of the ovalling mode based on the second harmonic of the electrical signal.

In an aspect of the non-destructive testing system 300, the frequency spectrum is configured to range from 20 to 2000 Hz.

In an aspect of the non-destructive testing system 300, the transducer 302 is the hammer and the vibrations are initiated by the impulse force generated by the hammer at the location ninety degrees from the first caliper connector 110 and opposite the position of the piezoelectric wire 118 on the cylindrical structure.

In an aspect of the non-destructive testing system 300, the transducer 302 is the electrodynamic shaker and the vibrations are initiated by the impulse force generated by the electrodynamic shaker at the location ninety degrees from the first caliper connector 110 and opposite the position of the piezoelectric wire 118 on the cylindrical structure.

The third embodiment describes the method 500 for non-destructive testing of the cylindrical structure. The method 500 comprising: connecting the first end 104*a* of the first arm 104 and the first end 106*a* of the second arm 106 of the H-shaped caliper 102 across the diameter of the cylindrical structure at the first height from the bottom of the solid cylindrical structure; stretching the piezoelectric wire 118 between the second end 104*b* of the first arm 104 and the second end 106*b* of the second arm 106; connecting the electrical terminal 120 of the piezoelectric wire 118 to the measurement unit 304; inducing vibrations in the cylindrical structure by striking the cylindrical structure at the second height selected from the range greater than the first height by 4 cm to 12 cm; receiving, by the measurement unit 304, the electrical signal generated by vibrations in the piezoelectric wire 118 in response to expansion and contraction of the distance between the second end 104*b* of the first arm 104 and the second end 106*b* of the second arm 106 as the result of the vibrations induced in the cylindrical structure; performing, by the measurement unit 304, the frequency analysis of the electrical signal to identify the resonance frequency of the ovalling mode of the electrical signal; matching, by the measurement unit 304, the resonance frequency of the ovalling mode to the database record including ovalling modes versus stiffness values for cylindrical structures; and outputting, on the display 412 of the measurement unit 304, the stiffness value.

In an aspect, the method 500 further comprising: storing, by the recorder 402, the electrical signal; generating, by the measurement unit 304, the time stamp of the sampling time of the electrical signal; amplifying, by the signal amplifier 404 connected to the recorder 402, the electrical signal; transforming, by the analog-to-digital converter 406 connected to the signal amplifier 404, the electrical signal to the digital signal; receiving, by the microcontroller 408 including circuitry and the memory including program instructions and at least one processor configured to execute the program instructions, the digital signal; performing, by the processor, the fast Fourier transform on the digital signal and generating the frequency spectrum of the digital signal; performing, by the frequency analyzer, the frequency analysis of the frequency spectrum to determine the resonance frequency of the ovalling mode; matching, by the microcontroller 408, the resonance frequency of the ovalling mode to the database 410 including records of frequencies of known ovalling modes versus stiffness values of cylindrical structures having the same cross-sectional size and the same material; and displaying, on the display 412 of the measurement unit 304, the stiffness value.

In an aspect, the method 500 further comprising: determining, by the measurement unit 304, the structural integrity of the cylindrical structure from the stiffness value; generating, by the measurement unit 304, the structural integrity report; and outputting the structural integrity report of the cylindrical structure on the display 412.

In an aspect, the method 500 further comprising: determining, from the frequency analysis, the amplitude of the resonance frequency of the ovalling mode; generating, by the measurement unit 304, the computer model of the cylindrical structure based on the frequency analysis; and comparing the computer model to the reference database record of ovalling mode frequencies and ovalling mode amplitudes of the cylindrical structure.

In an aspect, the method 500 further comprising: generating, by the measurement unit 304, the graph which represents the resonance frequencies of ovalling modes as the function of cross-sectional diameters of cylindrical structures; and comparing, by the measurement unit 304, the resonance frequency of the ovalling mode of the computer model to the graph; determining, by the measurement unit 304, the degree of strength weakening factors of the cylindrical structure; generating, by the measurement unit 304, the report of the structural integrity of the cylindrical structure based on the degree of strength weakening factors; and displaying, on the display 412 of the measurement unit 304, the report of the structural integrity.

In an aspect of the method 500, the cylindrical structure is one of the solid cylindrical structure and the hollow cylindrical structure.

Figure 9:
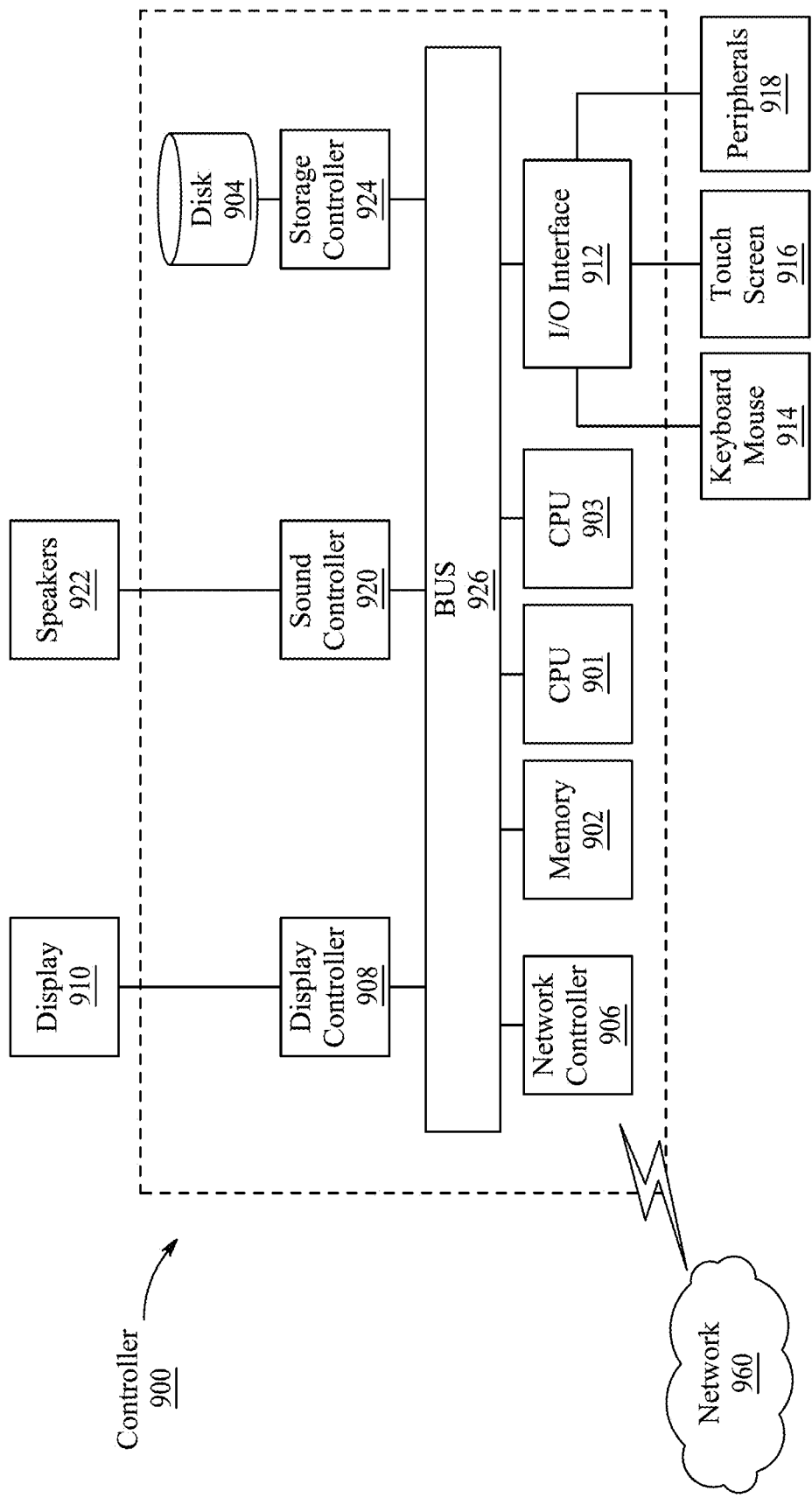
FIG. 9 is an illustration of a non-limiting example of details of computing hardware used in the computing system, according to certain embodiments.

Next, further details of the hardware description of the computing environment according to exemplary embodiments is described with reference to FIG. 9. In FIG. 9, a controller 900 is described as representative of the measurement unit 304, and specifically the microcontroller 408 therein, in which the controller 900 is a computing device which includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 7, Microsoft Windows 8, Microsoft Windows 10, UNIX, Solaris, LINUX, Apple MAC-OS, and other systems known to those skilled in the art.

The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN sub-networks. The network 960 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
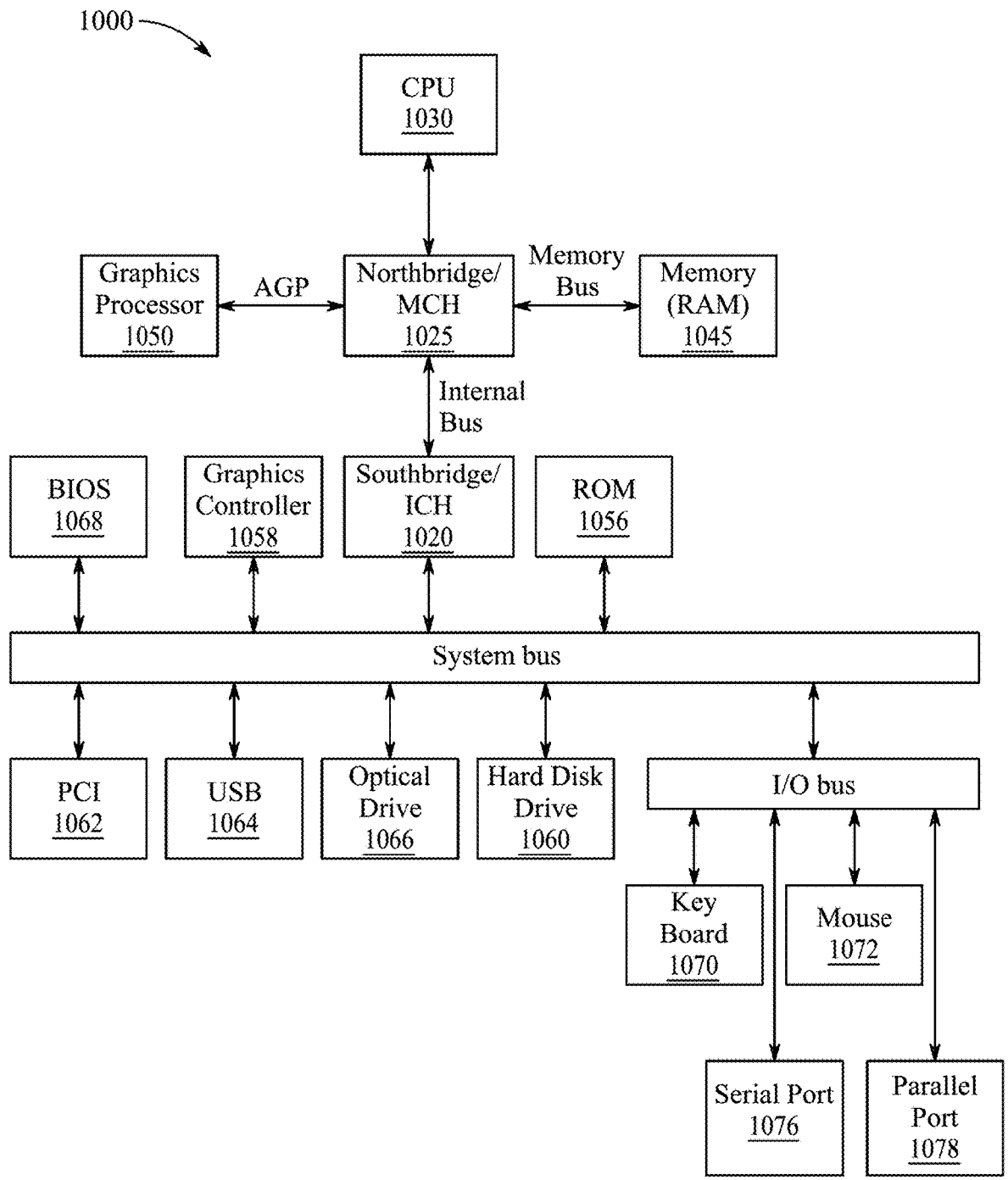
FIG. 10 is an exemplary schematic diagram of a data processing system used within the computing system, according to certain embodiments.

FIG. 10 shows a schematic diagram of a data processing system, according to certain embodiments, for performing the functions of the exemplary embodiments. The data processing system is an example of a computer in which code or instructions implementing the processes of the illustrative embodiments may be located.

In FIG. 10, data processing system 1000 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
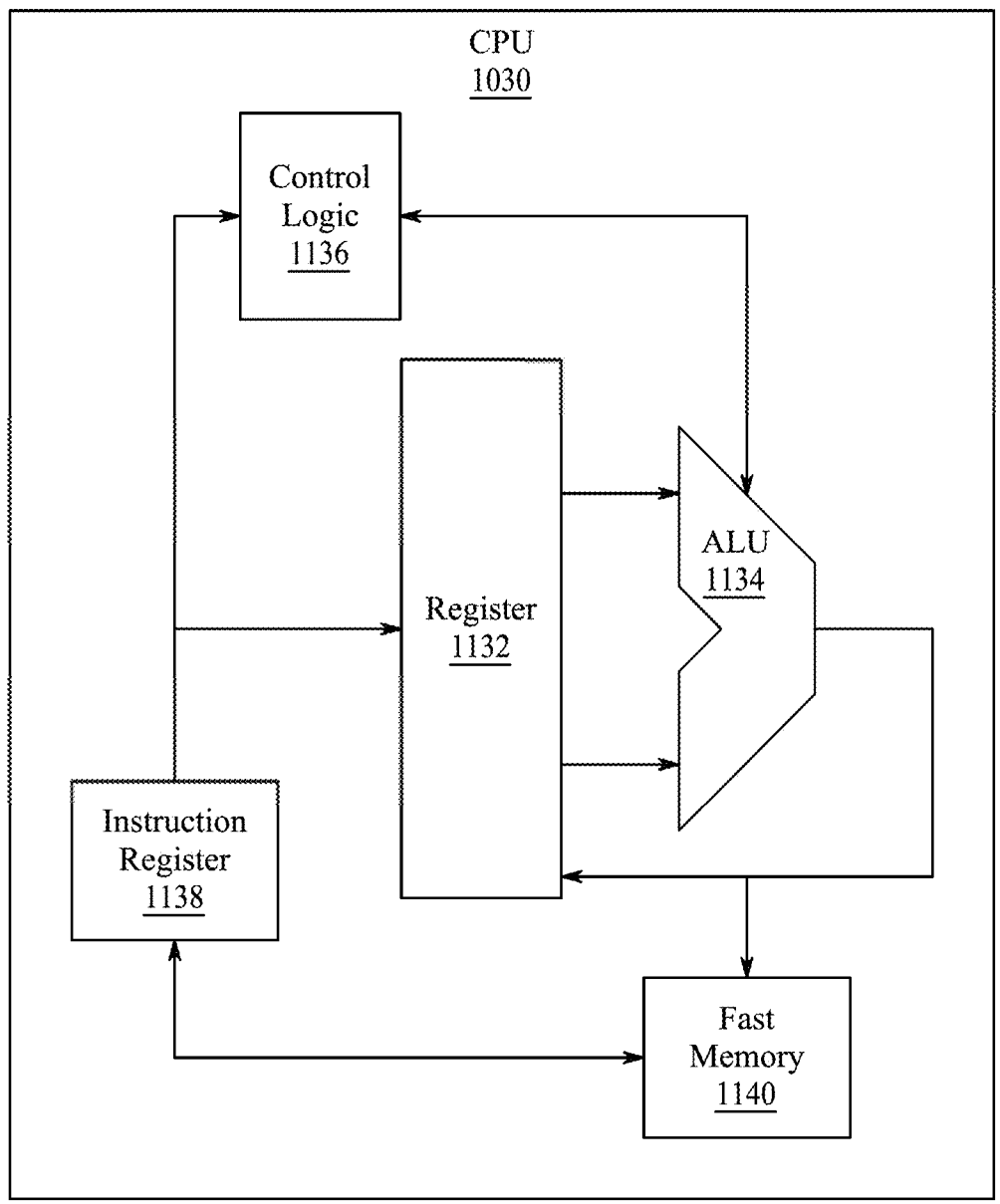
FIG. 11 is an exemplary schematic diagram of a processor used with the computing system, according to certain embodiments.

For example, FIG. 11 shows one implementation of CPU 1030. In one implementation, the instruction register 1138 retrieves instructions from the fast memory 1140. At least part of these instructions are fetched from the instruction register 1138 by the control logic 1136 and interpreted according to the instruction set architecture of the CPU 1030. Part of the instructions can also be directed to the register 1132. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain implementations, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1000 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 1088 through a PCI bus 1062.

The PCI devices may include, for example, Ethernet adapters, add-in cards, and PC cards for notebook computers. The Hard disk drive 1060 and CD-ROM 1066 can use, for example, an integrated drive electronics (IDE) or serial advanced technology attachment (SATA) interface. In one implementation the I/O bus can include a super I/O (SIO) device.

Further, the hard disk drive (HDD) 1060 and optical drive 1066 can also be coupled to the SB/ICH 1020 through a system bus. In one implementation, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 12:
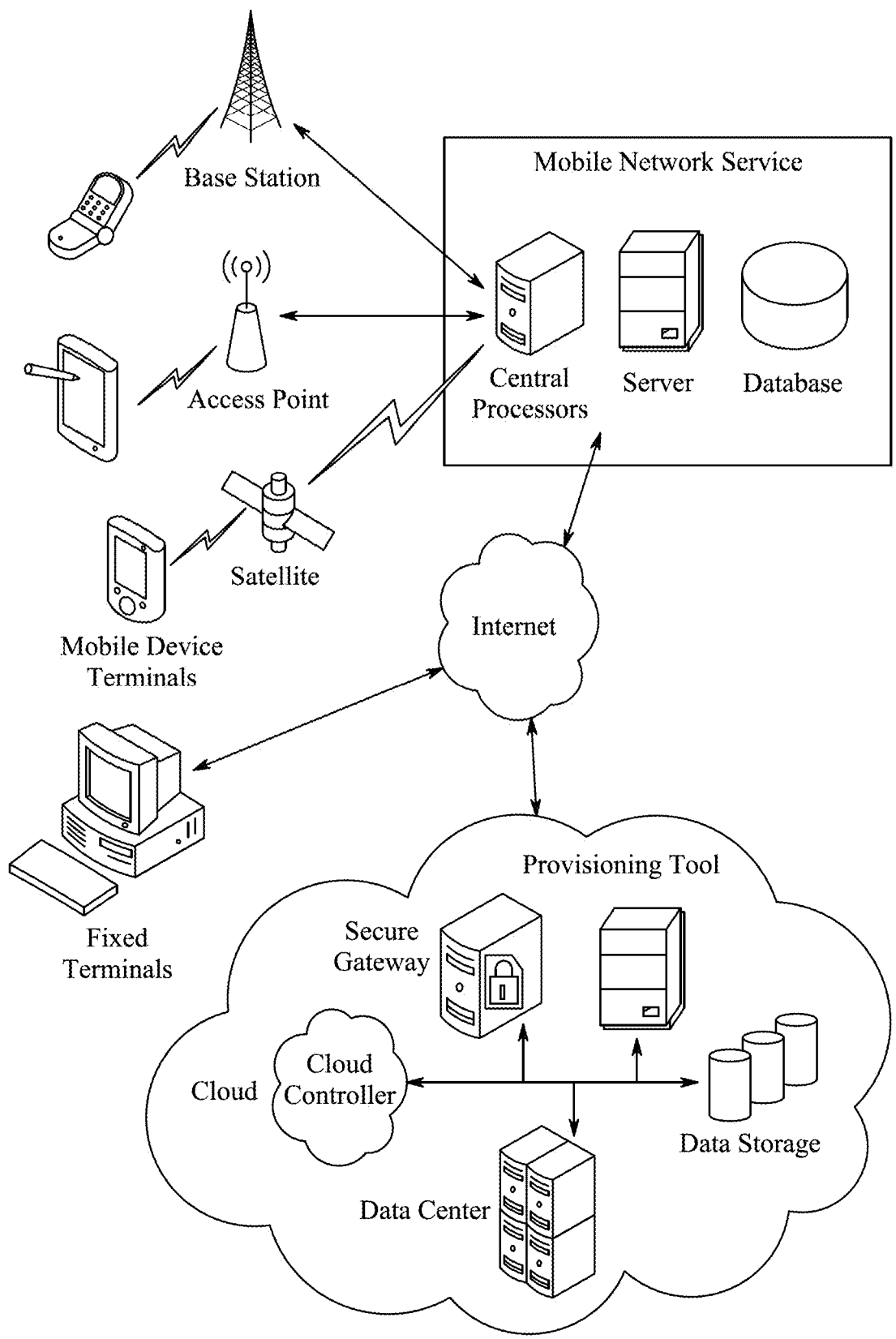
FIG. 12 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A piezoelectric sensor for sensing an ovalling mode in a cylindrical structure, comprising:
   an H-shaped caliper comprising a first arm, a second arm and a crossbar connected to and perpendicular to the first arm and the second arm;
   a first caliper connector located near a first end of the first arm;
   a second caliper connector located near a first end of the second arm;
   a first wire connector located near a second end of the first arm;
   a second wire connector located near a second end of the second arm;
   a piezoelectric wire connected to the first wire connector and the second wire connector, wherein the piezoelectric wire is stretched between the first wire connector and the second wire connector; and
   an electrical terminal connected to the piezoelectric wire at the second wire connector,
   wherein the electrical terminal is configured to receive an electrical signal generated by the piezoelectric wire in response to expansion and contraction of a distance between the second end of the first arm and the second end of the second arm as a result of vibrations induced in the cylindrical structure.

2. The piezoelectric sensor of claim 1, wherein the first caliper connector and the second caliper connector are connected to the cylindrical structure such that the first end of the first arm and the first end of the second arm are diametrically opposed across the cylindrical structure.

3. The piezoelectric sensor of claim 2, wherein a length of each arm from the crossbar to each second end is larger than a length from each caliper connector to the crossbar, wherein the length from the crossbar to each second end is configured to amplify the vibrations in the piezoelectric wire by increasing the expansion and contraction of the distance between the first end of the first arm and the first end of the second arm.

4. The piezoelectric sensor of claim 3, wherein a length of the crossbar is equal to a diameter of the cylindrical structure.

5. The piezoelectric sensor of claim 3, wherein the length of each arm from the crossbar to each second end is about two times the length from each caliper connector to the crossbar.

6. The piezoelectric sensor of claim 1, wherein the first arm, the second arm and the crossbar are formed of metal.

7. A non-destructive testing system for determining the strength condition of a cylindrical structure, comprising:
   a transducer configured to induce vibrations in the cylindrical structure;
   a piezoelectric sensor including:
      an H-shaped caliper comprising a first arm, a second arm and a crossbar connected to and perpendicular to the first arm and the second arm, wherein a length of the crossbar is equal to a cross-sectional diameter of the cylindrical structure;
      a first caliper connector located near a first end of the first arm;
      a second caliper connector located near a first end of the second arm;
      a first wire connector located near a second end of the first arm;
      a second wire connector located near a second end of the second arm;

a piezoelectric wire connected to the first wire connector and the second wire connector, wherein the piezoelectric wire is stretched between the first wire connector and the second wire connector; and
an electrical terminal connected to the piezoelectric wire near the second end of the second arm,
wherein the electrical terminal is configured to receive an electrical signal generated by vibrations in the piezoelectric wire in response to expansion and contraction of a distance between the second end of the first arm and the second end of the second arm as a result of the vibrations induced in the cylindrical structure; and
a measurement unit connected to the electrical terminal, wherein the measurement unit is configured to receive the electrical signal, perform a frequency analysis of the electrical signal and output a stiffness value of the cylindrical structure.

8. The non-destructive testing system of claim 7, wherein the measurement unit comprises:
a signal amplifier configured to amplify the electrical signal; and
a frequency analyzer configured to perform the frequency analysis of the electrical signal, determine an ovalling mode of the vibrations from the frequency analysis, match the frequency of the ovalling mode to a database record including ovalling modes versus stiffness values of cylindrical structures, and output the stiffness value onto a display of the measurement unit.

9. The non-destructive testing system of claim 7, wherein the measurement unit comprises:
a recorder configured to store the electrical signal for off-site processing and generate a time stamp of a sampling time of the electrical signal.

10. The non-destructive testing system of claim 7, wherein the measurement unit comprises:
a recorder configured to store the electrical signal and generate a time stamp of a sampling time of the electrical signal;
a signal amplifier connected to the recorder, wherein the signal amplifier is configured to amplify the electrical signal;
an analog-to-digital converter connected to the signal amplifier, wherein the analog-to-digital converter is configured to transform the electrical signal to a digital signal;
a microcontroller including circuitry and a memory including program instructions and at least one processor configured to execute the program instructions to:
receive the digital signal;
perform a fast Fourier transform on the digital signal and generate a frequency spectrum of the digital signal;
perform a frequency analysis of the frequency spectrum to determine a resonance frequency of an ovalling mode;
match the resonance frequency of the ovalling mode to a database including records of frequencies of known ovalling modes versus stiffness values of cylindrical structures having a same cross-sectional size and a same material; and
display the stiffness value on a display of the measurement unit.

11. The non-destructive testing system of claim 7, wherein the frequency analysis is configured to identify the resonance frequency of the ovalling mode based on a second harmonic of the electrical signal.

12. The non-destructive testing system of claim 11, wherein the frequency spectrum is configured to range from 20 to 2000 Hz.

13. The non-destructive testing system of claim 7, wherein the transducer is a hammer and the vibrations are initiated by an impulse force generated by the hammer at a location ninety degrees from the first caliper connector and opposite a position of the piezoelectric wire on the cylindrical structure.

14. The non-destructive testing system of claim 7, wherein the transducer is an electrodynamic shaker and the vibrations are initiated by an impulse force generated by the electrodynamic shaker at a location ninety degrees from the first caliper connector and opposite a position of the piezoelectric wire on the cylindrical structure.

15. A method for non-destructive testing of a cylindrical structure, comprising:
connecting a first end of a first arm and a first end of a second arm of an H-shaped caliper across a diameter of the cylindrical structure at a first height from a bottom of the solid cylindrical structure;
stretching a piezoelectric wire between a second end of the first arm and a second end of the second arm;
connecting an electrical terminal of the piezoelectric wire to a measurement unit;
inducing vibrations in the cylindrical structure by striking the cylindrical structure at a second height selected from a range greater than the first height by 4 cm to 12 cm;
receiving, by the measurement unit, an electrical signal generated by vibrations in the piezoelectric wire in response to expansion and contraction of a distance between the second end of the first arm and the second end of the second arm as a result of the vibrations induced in the cylindrical structure;
performing, by the measurement unit, a frequency analysis of the electrical signal to identify a resonance frequency of an ovalling mode of the electrical signal;
matching, by the measurement unit, the resonance frequency of the ovalling mode to a database record including ovalling modes versus stiffness values for cylindrical structures; and
outputting, on a display of the measurement unit, the stiffness value.

16. The method of claim 15, further comprising:
storing, by a recorder, the electrical signal;
generating, by the measurement unit, a time stamp of a sampling time of the electrical signal;
amplifying, by a signal amplifier connected to the recorder, the electrical signal;
transforming, by an analog-to-digital converter connected to the signal amplifier, the electrical signal to a digital signal;
receiving, by a microcontroller including circuitry and a memory including program instructions and at least one processor configured to execute the program instructions, the digital signal;
performing, by the processor, a fast Fourier transform on the digital signal and generating a frequency spectrum of the digital signal;
performing, by a frequency analyzer, a frequency analysis of the frequency spectrum to determine a resonance frequency of the ovalling mode;
matching, by the microcontroller, the resonance frequency of the ovalling mode to a database including records of frequencies of known ovalling modes versus stiffness values of cylindrical structures having a same cross-sectional size and a same material; and displaying, on a display of the measurement unit, the stiffness value.

17. The method of claim 16, further comprising:

determining, by the measurement unit, a structural integrity of the cylindrical structure from the stiffness value;

generating, by the measurement unit, a structural integrity report; and outputting the structural integrity report of the cylindrical structure on the display.

18. The method of claim 16, further comprising:

determining, from the frequency analysis, an amplitude of the resonance frequency of the ovalling mode;

generating, by the measurement unit, a computer model of the cylindrical structure based on the frequency analysis; and comparing the computer model to a reference database record of ovalling mode frequencies and ovalling mode amplitudes of the cylindrical structure.

19. The method of claim 18, further comprising:

generating, by the measurement unit, a graph which represents the resonance frequencies of ovalling modes as a function of cross-sectional diameters of cylindrical structures; and comparing, by the measurement unit, the resonance frequency of the ovalling mode of the computer model to the graph;

determining, by the measurement unit, a degree of strength weakening factors of the cylindrical structure;

generating, by the measurement unit, a report of a structural integrity of the cylindrical structure based on the degree of strength weakening factors; and displaying, on the display of the measurement unit, the report of the structural integrity.

20. The method of claim 15, wherein the cylindrical structure is one of a solid cylindrical structure and a hollow cylindrical structure.

* * * * *